(12) United States Patent
Zhou et al.

(10) Patent No.: US 11,751,171 B2
(45) Date of Patent: Sep. 5, 2023

(54) FEEDBACK-BASED BROADCASTING OF NETWORK CODED PACKETS WITH SIDELINK

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 17/363,601

(22) Filed: Jun. 30, 2021

(65) Prior Publication Data

US 2022/0015069 A1 Jan. 13, 2022

Related U.S. Application Data

(60) Provisional application No. 63/050,073, filed on Jul. 9, 2020.

(51) Int. Cl.
*H04W 72/02* (2009.01)
*H04W 72/04* (2023.01)
(Continued)

(52) U.S. Cl.
CPC .......... *H04W 72/02* (2013.01); *H04L 1/1896* (2013.01); *H04W 72/0466* (2013.01); *H04W 72/30* (2023.01); *H04W 80/02* (2013.01)

(58) Field of Classification Search
None
See application file for complete search history.

(56) References Cited

U.S. PATENT DOCUMENTS

2017/0033892 A1* 2/2017 Luby .................... H04L 1/0066
2017/0054777 A1* 2/2017 Leung .................... H04L 65/75

OTHER PUBLICATIONS

Dai J., et al., "LT Codes with Limited Feedback", 2014 IEEE International Conference on computer and Information Technology, IEEE, Sep. 11, 2014 (Sep. 11, 2014), pp. 669-673, XP032702894, DOI: 10.1109/CIT.2014.73 [retrieved on Dec. 12, 2014] abstract, section III.

(Continued)

*Primary Examiner* — Yemane Mesfin
*Assistant Examiner* — Jeff Banthrongsack
(74) *Attorney, Agent, or Firm* — Holland & Hart LLP

(57) ABSTRACT

Methods, systems, and devices for wireless communications are described. A network node may transmit, to a set of user equipment (UE), a set of network encoded packets generated using a set of packets. A UE of the set of UEs may receive subsets of network encoded packets from the network node and from UEs of the set of UEs forwarding network encoded packets. The UE may decode the subsets of network encoded packets and may determine a set of successfully decoded packets. The UE may transmit feedback to the network node that indicates successfully received or decoded packets. The network node may receive the feedback and may determine a subset of the set of packets that was successfully decoded for each UE providing the feedback. The network node may generate an updated set of network encoded packets and may transmit the updated set to the set of UEs.

16 Claims, 18 Drawing Sheets

(51) Int. Cl.
    *H04W 80/02*      (2009.01)
    *H04L 1/18*      (2023.01)
    *H04W 72/044*      (2023.01)
    *H04L 1/1867*      (2023.01)
    *H04W 72/30*      (2023.01)

(56) References Cited

OTHER PUBLICATIONS

Huawei, et al., "Sidelink Support & Enhancements for NR", 3GPP TSG-RAN WG Meeting #86, 3GPP Draft, R1-167207, 3rd Generation Partnership Project (3GPP), Mobile Competence Centre, 650, Route Des Lucioles, F-06921 Sophia-Anti Polls Cedex, France, vol. RAN WG1, No. Gothenburg, Sweden, Aug. 22, 2016-Aug. 26, 2016, Aug. 21, 2016, (Aug. 21, 2016), XP051142227, 7 Pages, Retrieved from the Internet: URL: http://www.3gpp.org/ftp/tsg_ran/WG1_RL1/TSGR1_86/Docs/ [retrieved on Aug. 12, 2016], Section 2, figure 1.

International Search Report and Written Opinion—PCT/US2021/040184—ISA/EPO—dated Oct. 21, 2021 (206067WO).

ZTE, et al., "Views on Rel-17 IAB", 3GPP TSG-RAN WG Meeting #86, 3GPP Draft, RP-192577, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 2, 2019 (Dec. 2, 2019), 6 Pages, XP051834225, Retrieved from the Internet: URL: https://www.3gpp.org/ftp/TSG_RAN/TSG_RAN/TSGR_86/Docs/RP-192577.zip, RP-192577 Views on Rel-17 IAB.doc [retrieved on Dec. 2, 2019], Section 2.5.

\* cited by examiner

FEEDBACK-BASED BROADCASTING OF NETWORK CODED PACKETS WITH SIDELINK

CROSS REFERENCE

The present application for patent claims the benefit of U.S. Provisional Patent Application No. 63/050,073 by Zhou et al., entitled "FEEDBACK-BASED BROADCASTING OF NETWORK CODED PACKETS WITH SIDELINK," filed Jul. 9, 2020, assigned to the assignee hereof, and expressly incorporated by reference herein.

FIELD OF TECHNOLOGY

The following relates generally to wireless communications and more specifically to feedback-based broadcasting of network coded packets with sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may support broadcasting of packets to a plurality of UEs. The transmitter (e.g., a network node, base station, etc.) may broadcast multiple packets to multiple receivers (e.g., UEs). The broadcasting may be repeated blindly without the transmitters identification of packets that have been received by the receivers.

SUMMARY

The described techniques relate to improved methods, systems, devices, and apparatuses that support feedback-based broadcasting of network coded packets with sidelink. Generally, the described techniques provide for a transmitter (e.g., a base station) to leverage feedback from receivers (e.g., a user equipment (UE)) for broadcasted packets to determine which packets of a set to retransmit. For example, a network node (e.g., a base station) may transmit, to a plurality of UEs, a set of one or more network encoded packets representing a set of one or more packets identified for broadcast to the plurality of UEs. A UE of the plurality of UEs may receive a first subset of the set of one or more network encoded packets and may receive, via a plurality of sidelink connections with the plurality of UEs, a second subset of one or more network encoded packets forwarded after successful receipt by the plurality of UEs from the network node. The UE may decode the first subset of one or more network encoded packets and the second subset of one or more network encoded packets and may determine, based on the decoding, a set of one or more successfully decoded packets from the network node. The UE may transmit feedback to the network node, where the feedback indicates the first and second subsets of network encoded packets (the successfully received network encoded packets) or the set of one or more successfully decoded packets. The network node may receive the feedback and may determine, based on the feedback, a subset of the set of one or more network encoded packets that was successfully decoded for each of the one or more of the plurality of UEs providing the feedback. The network node may generate an updated set of one or more network encoded packets based on feedback, where the updated set of one or more packets excludes successfully decoded packets included in each of the subsets, and may transmit the updated set of one or more network encoded packets to the plurality of UEs.

A method for wireless communication at a UE is described. The method may include receiving, as part of a broadcast from a network node, a first subset of one or more network encoded packets, receiving, via a plurality of sidelink connections with a corresponding plurality of UEs, a second subset of one or more network encoded packets forwarded after successful receipt by the plurality of UEs from the network node, decoding the first subset of one or more network encoded packets and the second subset of one or more network encoded packets, and determining, based on the decoding, a set of one or more successfully decoded packets from the network node.

An apparatus for wireless communication at a UE is described. The apparatus may include a processor, memory coupled with the processor, and instructions stored in the memory. The instructions may be executable by the processor to cause the apparatus to receive, as part of a broadcast from a network node, a first subset of one or more network encoded packets, receive, via a plurality of sidelink connections with a corresponding plurality of UEs, a second subset of one or more network encoded packets forwarded after successful receipt by the plurality of UEs from the network node, decode the first subset of one or more network encoded packets and the second subset of one or more network encoded packets, and determine, based on the decoding, a set of one or more successfully decoded packets from the network node.

Another apparatus for wireless communication at a UE is described. The apparatus may include means for receiving, as part of a broadcast from a network node, a first subset of one or more network encoded packets, means for receiving, via a plurality of sidelink connections with a corresponding plurality of UEs, a second subset of one or more network encoded packets forwarded after successful receipt by the plurality of UEs from the network node, means for decoding the first subset of one or more network encoded packets and the second subset of one or more network encoded packets, and means for determining, based on the decoding, a set of one or more successfully decoded packets from the network node.

A non-transitory computer-readable medium storing code for wireless communication at a UE is described. The code may include instructions executable by a processor to receive, as part of a broadcast from a network node, a first subset of one or more network encoded packets, receive, via a plurality of sidelink connections with a corresponding plurality of UEs, a second subset of one or more network encoded packets forwarded after successful receipt by the plurality of UEs from the network node, decode the first subset of one or more network encoded packets and the second subset of one or more network encoded packets, and determine, based on the decoding, a set of one or more successfully decoded packets from the network node.

Some examples of the method, apparatuses, and non-transitory computer-readable medium described herein may further include operations, features, means, or instructions for transmitting feedback to the network node, where the feedback indicates the first and second subsets of network encoded packets or the set of one or more successfully decoded packets.

Some examples of the method, apparatuses, and non-transitory computer-readable medium described herein may further include operations, features, means, or instructions for transmitting the first subset of one or more network encoded packets to the plurality of UEs via the plurality of sidelink connections.

Some examples of the method, apparatuses, and non-transitory computer-readable medium described herein may further include operations, features, means, or instructions for transmitting a channel state information message in conjunction with transmitting feedback to the network node.

In some examples of the method, apparatuses, and non-transitory computer-readable medium described herein, the feedback includes at least one negative acknowledgement message, at least one acknowledgement message, or both.

Some examples of the method, apparatuses, and non-transitory computer-readable medium described herein may further include operations, features, means, or instructions for receiving an indication of one or more network coding parameters, the one or more network coding parameters including a network coding algorithm, a network encoding function, a network encoding matrix, a number of decoding iterations, or any combination thereof.

In some examples of the method, apparatuses, and non-transitory computer-readable medium described herein, receiving the indication of the one or more network coding parameters may include operations, features, means, or instructions for receiving the one or more network coding parameters using medium access control (MAC) control element signaling, downlink control information signaling, radio resource control signaling, or any combination thereof.

In some examples of the method, apparatuses, and non-transitory computer-readable medium described herein, receiving the indication of the one or more network coding parameters may include operations, features, means, or instructions for receiving an indication to switch from one or more prior network coding parameters to the one or more network coding parameters.

Some examples of the method, apparatuses, and non-transitory computer-readable medium described herein may further include operations, features, means, or instructions for transmitting, to the network node, a request for the one or more network coding parameters, where the indication of the one or more network coding parameters may be received based on transmitting the request.

In some examples of the method, apparatuses, and non-transitory computer-readable medium described herein, transmitting the request may include operations, features, means, or instructions for transmitting the request using medium access control (MAC) control element signaling or uplink control information signaling.

Some examples of the method, apparatuses, and non-transitory computer-readable medium described herein may further include operations, features, means, or instructions for receiving a third subset of one or more network encoded packets from the network node based on transmitting feedback to the network node, where the third subset of one or more network encoded packets may be different from the first subset of one or more network encoded packets and the second subset of one or more network encoded packets.

In some examples of the method, apparatuses, and non-transitory computer-readable medium described herein, the third subset of one or more network encoded packets may be provided via broadcast signaling.

In some examples of the method, apparatuses, and non-transitory computer-readable medium described herein, the third subset of one or more network encoded packets may be provided via unicast signaling.

Some examples of the method, apparatuses, and non-transitory computer-readable medium described herein may further include operations, features, means, or instructions for transmitting feedback to the network node via a packet data convergence protocol (PDCP) status report, a radio link control (RLC) status report, or a hybrid automatic repeat request (HARD) message.

Some examples of the method, apparatuses, and non-transitory computer-readable medium described herein may further include operations, features, means, or instructions for transmitting feedback to the network node in a network coding sub-layer, where the feedback indicates a decoding status of each packet of the set of one or more successfully decoded packets.

A method for wireless communication at a network node is described. The method may include transmitting, to a plurality of UEs, a set of one or more network encoded packets representing a set of one or more packets identified for broadcast to the plurality of UEs, receiving feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets, determining, based on the feedback, a subset of the set of one or more network encoded packets that was successfully decoded for each of the one or more of the plurality of UEs providing the feedback, generating, based on the feedback, an updated set of one or more network encoded packets based on an updated set of one or more packets, where the updated set of one or more packets excludes successfully decoded packets included in each of the subsets, and transmitting the updated set of one or more network encoded packets to the plurality of UEs.

An apparatus for wireless communication at a network node is described. The apparatus may include a processor, memory coupled with the processor, and instructions stored in the memory. The instructions may be executable by the processor to cause the apparatus to transmit, to a plurality of UEs, a set of one or more network encoded packets representing a set of one or more packets identified for broadcast to the plurality of UEs, receive feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets, determine, based on the feedback, a subset of the set of one or more network encoded packets that was successfully decoded for each of the one or more of the plurality of UEs providing the feedback, generate, based on the feedback, an updated set of one or more network encoded packets based on an updated set of one or more packets, where the updated set of one or more packets excludes successfully decoded packets included in each of the subsets, and transmit the updated set of one or more network encoded packets to the plurality of UEs.

Another apparatus for wireless communication at a network node is described. The apparatus may include means for transmitting, to a plurality of UEs, a set of one or more network encoded packets representing a set of one or more packets identified for broadcast to the plurality of UEs, means for receiving feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets, means for determining, based on the feedback, a subset of the set of one or more network encoded packets that was successfully decoded for each of the one or more of the plurality of UEs providing the feedback, means for generating, based on the feedback, an updated set of one or more network encoded packets based on an updated set of one or more packets, where the updated set of one or more packets excludes successfully decoded packets included in each of the subsets, and means for transmitting the updated set of one or more network encoded packets to the plurality of UEs.

A non-transitory computer-readable medium storing code for wireless communication at a network node is described. The code may include instructions executable by a processor to transmit, to a plurality of UEs, a set of one or more network encoded packets representing a set of one or more packets identified for broadcast to the plurality of UEs, receive feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets, determine, based on the feedback, a subset of the set of one or more network encoded packets that was successfully decoded for each of the one or more of the plurality of UEs providing the feedback, generate, based on the feedback, an updated set of one or more network encoded packets based on an updated set of one or more packets, where the updated set of one or more packets excludes successfully decoded packets included in each of the subsets, and transmit the updated set of one or more network encoded packets to the plurality of UEs.

In some examples of the method, apparatuses, and non-transitory computer-readable medium described herein, determining the subset of the set of one or more network encoded packets that was successfully decoded may include operations, features, means, or instructions for determining which of the successfully received network encoded packets were successfully decoded so as to be added to the successfully decoded packets.

Some examples of the method, apparatuses, and non-transitory computer-readable medium described herein may further include operations, features, means, or instructions for continuing to update and transmit the updated set of one or more network encoded packets based on additional feedback received from the one or more of the plurality of UEs until the updated set of one or more network encoded packets may be empty.

In some examples of the method, apparatuses, and non-transitory computer-readable medium described herein, determining the subset of the set of one or more network encoded packets may include operations, features, means, or instructions for determining an intersection the successfully decoded packets associated with each of the subsets indicated in the feedback to identify the successfully decoded packets common to each of the subsets.

Some examples of the method, apparatuses, and non-transitory computer-readable medium described herein may further include operations, features, means, or instructions for determining, based on the feedback indicative of the successfully received network encoded packets, the successfully decoded network encoded packets, or both a second subset of the set of one or more network encoded packets that was successfully decoded at any of the one or more of the plurality of UEs providing the feedback, where the updated set of one or more network encoded packets further excludes the second subset of the set of one or more network encoded packets.

In some examples of the method, apparatuses, and non-transitory computer-readable medium described herein, determining the second subset of the set of one or more network encoded packets may include operations, features, means, or instructions for determining a union of the successfully decoded packets associated with each of the subsets indicated in the feedback to identify the second subset of the set of one or more network encoded packets.

In some examples of the method, apparatuses, and non-transitory computer-readable medium described herein, receiving the feedback may include operations, features, means, or instructions for receiving the feedback via a packet data convergence protocol (PDCP) status report, a RLC status report, or a HARQ message.

In some examples of the method, apparatuses, and non-transitory computer-readable medium described herein, receiving the feedback may include operations, features, means, or instructions for receiving the feedback in a network coding sub-layer, where the feedback indicates a decoding status of each packet of the set of one or more packets.

Some examples of the method, apparatuses, and non-transitory computer-readable medium described herein may further include operations, features, means, or instructions for receiving a channel state information message in conjunction with the feedback, and determining one or more encoding metrics for transmission of the updated set of one or more packets based on the channel state information message.

In some examples of the method, apparatuses, and non-transitory computer-readable medium described herein, determining the one or more encoding metrics may include operations, features, means, or instructions for determining a modulation and coding scheme, an encoding rate, or both.

In some examples of the method, apparatuses, and non-transitory computer-readable medium described herein, receiving the channel state information message may include operations, features, means, or instructions for receiving the channel state information message based on the feedback indicating a negative acknowledgement for one or more of the set of one or more network encoded packets.

Some examples of the method, apparatuses, and non-transitory computer-readable medium described herein may further include operations, features, means, or instructions for transmitting, to one or more of the plurality of UEs, an indication of one or more network coding parameters, where at least the updated set of one or more network encoded packets may be transmitted to the plurality of UEs in accordance with the one or more network coding parameters.

In some examples of the method, apparatuses, and non-transitory computer-readable medium described herein, transmitting the indication of the one or more network coding parameters may include operations, features, means, or instructions for transmitting an indication of a network coding algorithm, a network encoding function, a network encoding matrix, a number of decoding iterations, or any combination thereof.

In some examples of the method, apparatuses, and non-transitory computer-readable medium described herein, transmitting the indication of the one or more network coding parameters may include operations, features, means, or instructions for transmitting the one or more network coding parameters using medium access control-control element (MAC-CE) signaling, downlink control information signaling, radio resource control signaling, or any combination thereof.

In some examples of the method, apparatuses, and non-transitory computer-readable medium described herein, transmitting the indication of the one or more network coding parameters may include operations, features, means, or instructions for transmitting an indication to switch from one or more prior network coding parameters to the one or more network coding parameters.

Some examples of the method, apparatuses, and non-transitory computer-readable medium described herein may further include operations, features, means, or instructions for receiving, from the one or more of the plurality of UEs, a request for the one or more network coding parameters, where the indication of the one or more network coding parameters may be transmitted based on receiving the request.

In some examples of the method, apparatuses, and non-transitory computer-readable medium described herein, receiving the request may include operations, features, means, or instructions for receiving, the request using medium access control-control element (MAC-CE) signaling or uplink control information signaling.

In some examples of the method, apparatuses, and non-transitory computer-readable medium described herein, transmitting the updated set of one or more network encoded packets may include operations, features, means, or instructions for transmitting the updated set of one or more network encoded packets via broadcast signaling based on a number of the plurality of UEs that may have failed to decode each packet of the set of one or more network encoded packets being above a threshold amount.

In some examples of the method, apparatuses, and non-transitory computer-readable medium described herein, transmitting the updated set of one or more network encoded packets may include operations, features, means, or instructions for transmitting the updated set of one or more network encoded packets via unicast signaling based on a number of the plurality of UEs that may have failed to decode each packet of the set of one or more network encoded packets being below a threshold amount.

Some examples of the method, apparatuses, and non-transitory computer-readable medium described herein may further include operations, features, means, or instructions for identifying the set of one or more packets from a packet pool scheduled for broadcast to the plurality of UEs.

Some examples of the method, apparatuses, and non-transitory computer-readable medium described herein may further include operations, features, means, or instructions for identifying one or more additional packets for broadcast to the plurality of UEs based on the one or more additional packets being added to the packet pool.

Some examples of the method, apparatuses, and non-transitory computer-readable medium described herein may further include operations, features, means, or instructions for encoding the set of one or more network encoded packets according to a Luby transform (LT) code, where each network encoded packet of the set of one or more network encoded packets may be constructed from one or more packets of the set of one or more packets identified for broadcast to the plurality of UEs according to a distribution.

In some examples of the method, apparatuses, and non-transitory computer-readable medium described herein, the distribution includes an ideal soliton distribution, a robust soliton distribution, or any combination thereof.

DETAILED DESCRIPTION

Figure 1:
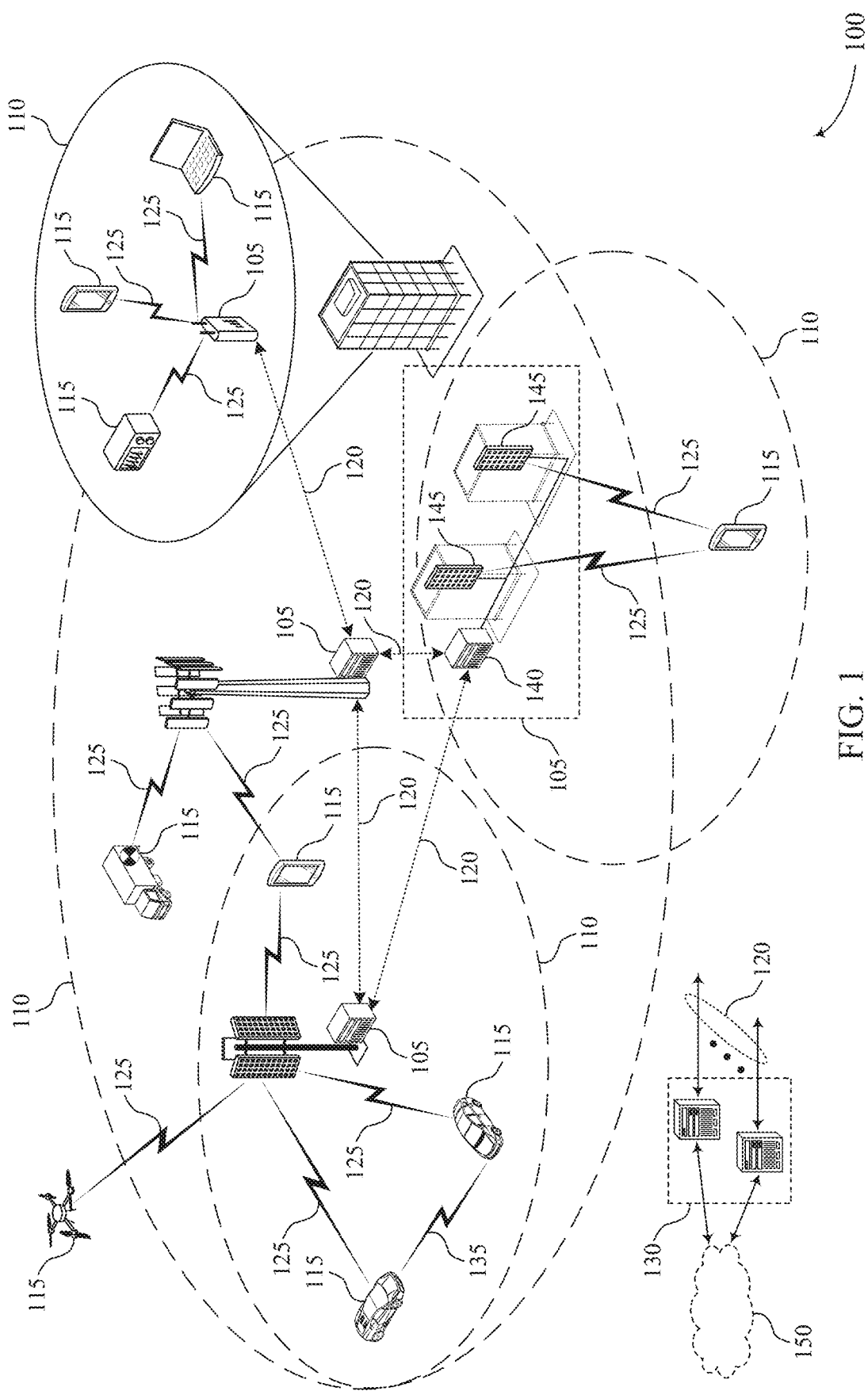
FIG. 1 through 3 illustrate examples of wireless communications systems that support feedback-based broadcasting of network coded packets with sidelink in accordance with aspects of the present disclosure.

Wireless communications systems may support broadcasting of network coded packets to receiving devices. The transmitter (e.g., a network node, base station, etc.) may broadcast multiple packets to multiple receivers (e.g., each user equipment (UE) of a set of UEs). Additionally, receivers may broadcast packets directly to one another in sidelink communication channels without transmitting through a base station or through a relay point. Sidelink communication may be an example of device-to-device (D2D) communication, vehicle-to-everything (V2X) communication, or another example of sidelink communication in a wireless communications system. The broadcasting may be repeated blindly without the transmitters identifying or determining of network coded packets that have been decoded by the receivers. That is, if the broadcasting system does not utilize feedback associated with packets, the transmitter may continue to transmit packets blindly without any indication of packets that have been decoded by the UEs. Thus, the transmitter may rebroadcast packets in a wasteful manner, since some packets may have been decoded by each receiver. Thus, the lack of feedback may result in waste, duplication of packets, and decreased efficiency.

Techniques described herein may leverage feedback for broadcasted packets to determine which packets of a set to retransmit. The transmitter may identify a set of packets for broadcast to a set of UEs and transmit a set of network encoded packets based on the set of packets. In some examples, the transmitter may encode the set of network encoded packets according to a Luby transform (LT) code, where each network encoded packet of the set of network encoded packets may be constructed from one or more packets according to a distribution (e.g., an ideal soliton distribution, a robust soliton distribution, among other examples).

The UEs may each rebroadcast successfully received network encoded packets via sidelink communications. When each UE has received a first round of network encoded packets from both the transmitter as wells as from other UEs, each UE may determine to transmit feedback to the original transmitter. Each UE may transmit feedback that indicates successfully received packets at the UE or that indicates successfully decoded packets at the UE.

The feedback may be received via one or more hybrid automatic repeat request (HARD) messages, using a packet data convergence protocol (PDCP) status report, or a radio link control (RLC) status report. Further, the transmitter may configure the UEs with network encoding parameters, such as a network coding algorithm, a network coding function, a network encoding matrix, a number of decoding iterations, or a combination thereof. Thus, the transmitter and the UEs may be synchronized such that the transmitter may encode the packets and the UEs may decode the packets. In some examples, the transmitter may adjust encoding metrics, such as a modulation and coding scheme (MCS) or encoding rate, based on the feedback such that the UEs may have a higher probability of successfully decoding packets. These and other implementations are further described with respect to the figures herein.

The transmitter may generate an updated set of network encoded packets based on the feedback received from one or more of the UEs. The updated set of network encoded packets may be determined based on the transmitter inferring (e.g., determining), from the feedback, which packets have been commonly decoded at the one or more of the UEs or a union of the packets decoded at the one or more of the UEs. The transmitter may continue to update and transmit the updated set of network encoded packets based on feedback until the transmitter determines that each UE has recovered the set of packets.

Particular aspects of the subject matter described herein may be implemented to realize one or more advantages. The described techniques may support improvements in the packet broadcasting framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Additional aspects of the disclosure are described in the context of process flows. Aspects of the disclosure are further illustrated by and described with reference to apparatus diagrams, system diagrams, and flowcharts that relate to feedback-based broadcasting of network coded packets with sidelink.

FIG. 1 illustrates an example of a wireless communications system 100 that supports feedback-based broadcasting of network coded packets with sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems 100 may support broadcasting packets to a plurality of UEs 115. The packets may be broadcast by a network node, which may be an example of a base station 105, UE 115, or the like. The transmitter may broadcast multiple packets to multiple receivers (e.g., UEs 115). The broadcasting may be repeated blindly without the transmitter knowing whether packets have been received or decoded by the receivers. That is, if the wireless communications system 100 does not utilize feedback associated with the packets, the transmitter may continue to transmit packets blindly without any indication of packets that have actually been decoded by the UEs 115. Thus, the transmitter may rebroadcast packets in a wasteful manner, since some packets may have been decoded by all UEs 115. Thus, the lack of feedback may result in waste, unnecessary duplication of packets, and low efficiency.

Techniques described herein support a packet broadcasting design that uses feedback received from the UEs 115. The transmitter (e.g., base station 105) may identify a set of packets for broadcasting to a plurality of UEs 115 and transmit a set of network encoded packets based on the set of packets. The UEs 115 may each rebroadcast successfully received network encoded packets via sidelink communications. When each UE 115 has received a first round of network encoded packets from both the transmitter as well as from other UEs 115, each UE 115 may report to the original transmitter via feedback. The feedback may indicate successfully received network encoded packets at each UE 115 or may indicate successfully decoded packets at each UE 115.

The transmitter may generate an updated set of network encoded packets based on the feedback received from one or more of the UEs 115. The updated set of network encoded packets may be determined based on the transmitter inferring (e.g., determining), from the feedback, which packets have been commonly decoded at the one or more of the UEs 115 or a union of the packets decoded at the one or more of the UEs 115. The transmitter may continue to update and transmit the updated set of network encoded packets based on feedback until the transmitter determines that each UE 115 has recovered the set of packets.

Using this technique, the transmitter may reduce waste and duplication of packets by retransmitting packets that have not been decoded by the UEs 115. This may result in increased efficiencies in the wireless communications system 100, such as a broadcasting system.

Different types of feedback may support these techniques. For example, the transmitter (e.g., base station 105) may use HARQ messages received from the UEs 115 to update the sets of packets. The HARQ message may indicate an acknowledgement (ACK) or negative-acknowledgement (NACK) for one or more packets. Thus, based on the ACKs and NAKs, the transmitter may determine which packets were successfully received by which UEs 115. In some examples, the feedback is received via one or more PDCP status reports, one or more RLC status reports, or the like. Further to support these techniques, the transmitter may configure the UEs 115 with network coding parameters, which the UEs 115 may use to decode the packets. The transmitter may update the various encoding metrics during the broadcasting to increase the likelihood that the UEs 115 are able to decode the packets. For example, the transmitter may receive a channel state information (CSI) report based on receiving a NACK for one or more packets and update the modulation and coding scheme or encoding rate based on the CSI report.

Figure 2:
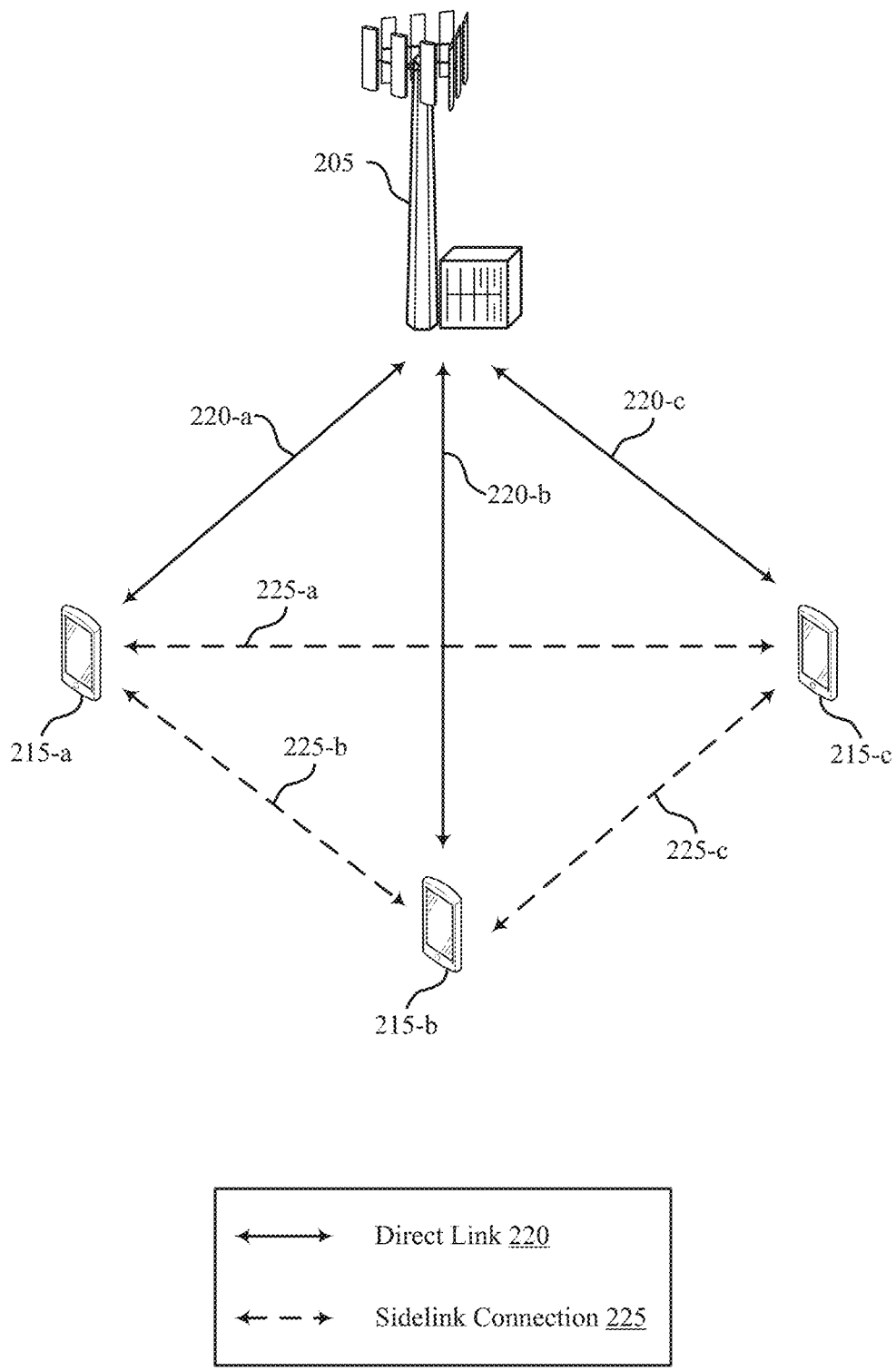

FIG. 2 illustrates an example of a wireless communications system 200 that supports feedback-based broadcasting of network coded packets with sidelink in accordance with aspects of the present disclosure. In some examples, the wireless communications system 200 may implement aspects of the wireless communications system 100. For example, the wireless communications system 200 may include a network entity 205 and UEs 215, which may be examples of the corresponding devices described with reference to FIG. 1. The wireless communications system 200 may illustrate an example of a packet broadcasting system. The network entity 205 may be an example of a base station 105 described with reference to FIG. 1, a network node, a transmitter, or the like. The UEs 215 may an example of a UE 115 as described with reference to FIG. 1. The wireless communications system 200 may include features for improved packet transmission operations, among other benefits.

The UEs 215 may transmit and receive communications as scheduled by the network entity 205. For example, the UEs 215 may communicate with the network entity via direct links 220 (e.g., communication links 125 described with reference to FIG. 1). Additionally, the UEs 215 may communicate directly with one another via sidelink connections 225 without transmitting through the network entity 205. For instance, UE 215-a may communicate with UE 215-c via sidelink connection 225-a; UE 215-a may communicate with UE 215-b via sidelink connection 225-b; and UE 215-b may communicate with UE 215-c via sidelink connection 225-c. The sidelink connections 225 may illustrate examples of D2D communication, V2X communication, or another example of sidelink communication in the wireless communications system 200.

In some cases, the wireless communications system 200 may support broadcasting packets by the network entity 205 to the UEs 215 via the direct links 220. The network entity 205 may repeat the broadcasting blindly without knowing whether the packets were received or decoded by the UEs 215. That is, if the wireless communications system 200 does not utilize feedback associated with the packets, the network entity 205 may continue to transmit packets blindly without any indication of packets that have actually been received or decoded by the UEs 215. Thus, the network entity 205 may rebroadcast packets in a wasteful manner, since some packets may have been received or decoded by all UEs 215. Thus, the lack of feedback may result in waste, unnecessary duplication of packets, and low efficiency.

Techniques described herein support a packet broadcasting design that uses feedback received from the UEs 215. The network entity 205 may identify a set of packets for broadcasting to the UEs 215 and transmit a set of network encoded packets based on the set of packets via the direct links 220. The UEs 215 may each rebroadcast successfully received network encoded packets via the sidelink connections 225. When each UE 215 has received a first round of network encoded packets from both the network entity 205 as well as from other UEs 215, each UE 215 may report to the network entity 205 via feedback on a direct link 220. The feedback may indicate successfully received network encoded packets or successfully decoded packets at each UE 215.

Each of the receiving UEs 215 may provide feedback associated with receiving the broadcasted network encoded packets. For example, feedback received from a particular UE 215 may indicate a subset of successfully received network encoded packets of the set of network encoded packets or may indicate a subset of successfully decoded packets of the set of packets used to generate the set of network encoded packets. The network entity 205 may generate an updated set of network encoded packets based on the feedback received from one or more of the UEs 215. The updated set of network encoded packets may be determined based on the transmitter inferring (e.g., determining), from the feedback, which packets have been commonly decoded at the one or more of the UEs or a union of the packets decoded at the one or more of the UEs. The network entity 205 may continue to update and transmit the updated set of network encoded packets based on feedback until the network entity 205 determines that each UE 215 of the UEs 215 has recovered the set of packets.

Using this technique, the network entity 205 may reduce waste and duplication of packets by retransmitting packets that have not been received by the UEs 215. This may result in increased efficiencies in the wireless communications system 200.

Figure 3:
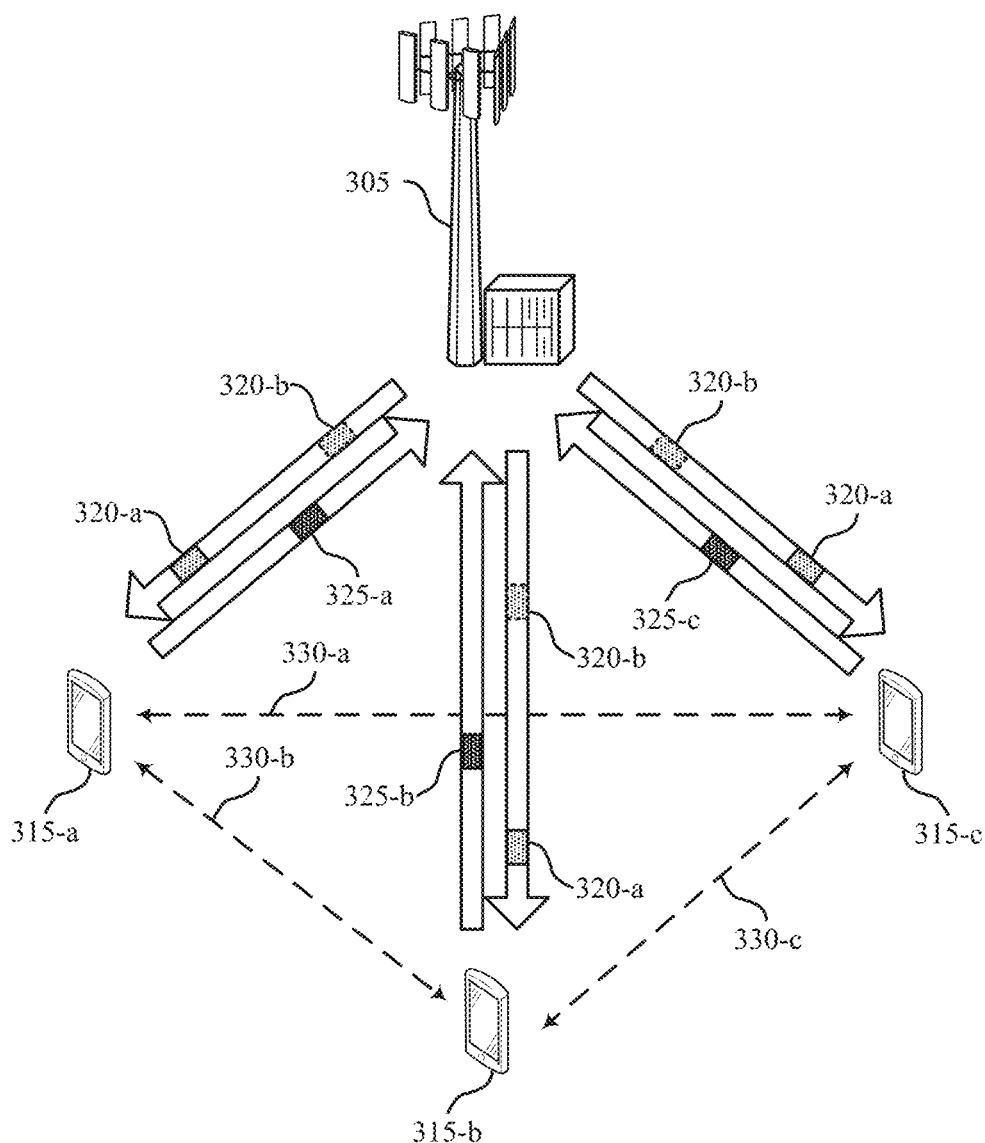

FIG. 3 illustrates an example of a wireless communications system 300 that supports broadcasting packets using network coding via sidelink with feedback in accordance with aspects of the present disclosure. In some examples, the wireless communications system 300 may implement aspects of wireless communications systems 100 and 200. For example, the wireless communications system 300 may include a network entity 305 and UEs 315, which may be examples of the corresponding devices described with reference to FIGS. 1 and 2. The wireless communications system 300 may illustrate an example of a packet broadcasting system. The wireless communications system 300 may include features for improved packet transmission operations, among other benefits.

The network entity 305 may configure the UEs 315 with network coding parameters, such as an encoding matrix, encoding/decoding function, etc. These parameters may be used by the UEs 315 to decode the packets. For example, a row of the encoding matrix may indicate an ordering or grouping of network encoded packets that are transmitted to the UEs 315. The network coding parameters may be signaling using medium access control-control element (MAC-CE) signaling, downlink control information (DCI), or RRC signaling. In some cases, multiple sets of network coding parameters may be signaled.

The network entity 305 may identify a set of packets for transmission to the UEs 315. In one example, the network entity 305 identifies the set of packets from a packet pool, which may be a set of packets scheduled for broadcasting. In some examples, the broadcasting may support a content streaming service and the packets may correspond to the streamed content. From the set of packets, the network entity 305 may encode (e.g., using LT coding) and transmit a set of network encoded packets 320-a to the UEs 315 in a broadcast manner. Each of the UEs 315 may receive one or more encoded packets of the set of network encoded packets 320-a. The UEs 315 may each rebroadcast successfully received network encoded packets 320-a via sidelink connections 330. For instance, UE 315-a may rebroadcast the decoded packets via one or more of sidelink connections 330-a and 330-b; UE 315-b may rebroadcast the decoded packets via one or more of sidelink connections 330-b and 330-c; and UE 315-c may rebroadcast the decoded packets via one or more of sidelink connections 330-a and 330-c.

When each UE 315 has received a first round of network encoded packets 320-a from both the network entity 305 as wells as from other UEs 115, each UE 115 may report to the network entity 305 via feedback 325. The feedback 325 may indicate a subset of the set of network encoded packets 320-a that each UE 315 was able to successfully receive or a subset of the set of packets used to generate the set of network encoded packets 320-a that each UE 315 was able to successfully decode, either directly from the network entity 305 or via the sidelink connections 330. For example, the UE 315-a may transmit feedback 325-a that indicates a first subset of the set of packets that the UE 315-a was able to successfully receive or decode, while the UE 315-b transmits feedback 325-b that indicates a second subset of the set of packets that the UE 315-b was able to successfully receive or decode, and the UE 315-c transmits feedback 325-c that indicates a second subset of the set of packets that the UE 315-c was able to successfully receive or decode.

Based on the received feedback 325, the network entity 305 may generate an updated set of network encoded packets 320-b. The updated set of network encoded packets may be determined based on the transmitter inferring (e.g., determining), from the feedback, which packets have been commonly decoded at the one or more of the UEs 315 or a union of the packets decoded at the one or more of the UEs 315. The updated set of network encoded packets 320-b is transmitted to the UEs 315 and the network entity 305 may continue to update and transmit updated sets of network encoded packets 320 based on feedback 325 until the network entity 305 determines that each UE 315 of the UEs 315 has recovered the set of packets.

As described herein, the feedback 325 may be an example of one or HARQ messages. In other cases, the feedback 325 may be an example of a PDCP status report or RLC status report. Based on the reports or HARQ messages, the network entity 305 may infer (e.g., determine) the packet receiving/recovery results. In some examples, the UEs 315 may transmit the feedback 325 in the network coding sub-layer, and such feedback 325 may directly indicate the receiving success/failure corresponding to each packet. Thus, rather than inferring (e.g., determining) packet decoding success failure based on HARQ messages (e.g., correlating HARQ messages to packets), the feedback 325 may directly indicate packet receiving success and/or failure. In some cases, one or more of the UEs 315 transmit a CSI report to facilitate MCS selection and/or rate control. Thus, based on received feedback 325 and a CSI report, the network entity 305 may adjust the MCS or encoding rate to increase likelihood of successful decoding by the UEs 315. In some examples, the CSI report is transmitted when a NACK is transmitted in order to request the updated MCS or data encoding rate for better data reception.

As described herein, one or more sets of network coding parameters may be configured at the UEs 315. If one set of parameters is configured at one or more of the UEs 315 and the network entity 305 determines that the transmission is underperforming (e.g., that the feedback 325 indicates that a relatively high number of packets are not decoded), then the network entity 305 may transmit a new set of network coding parameters to the UEs 315 (e.g., via MAC-CE or DCI). In other cases, the UE 315 may request an updated set of network coding parameters (e.g., via MAC-CE or uplink control information (UCI)). In either case, after the updated set of parameters is transmitted, subsequent sets of packets may be encoded and transmitted according to the updated set of parameters. If multiple sets of network coding parameters are synchronized between the network entity 305 and the UEs 315, then the network entity 305 may transmit an instruction to switch between sets of parameters (e.g., based on underperformance or based on a request from a UE 315 received via MAC-CE or UCI) via MAC-CE or DCI.

In some examples, the network entity 305 may encode the network encoded packets 320 using an LT coding process. In the LT coding process, the network entity 305 may map source symbols of the set of packets to a set of encoding symbols. The LT coding process may employ a degree distribution $\Omega$, where the degree distribution $\Omega$ represents a probability mass function of a set of degrees $d_i$ (e.g., $d_1$, $d_2$, $d_3$, etc.). The probability of randomly selecting a degree $d_i$ (i.e., a degree with index i) from the degree distribution may be represented by $\rho(i)$. In the LT coding process, the degree $d_i$ of an ith encoding symbol may represent the quantity of source symbols which the network entity 305 may combine into the ith encoding symbol. For example, if the selected degree for a first encoding symbol is $d_1=2$, two source symbols may be randomly selected and combined into the first encoding symbol. Similarly, if the selected degree for a second encoding symbol is $d_2=1$, a single source symbol may be combined into the second encoding symbol. In some examples, the source symbols may be combined into encoding symbols using a logic operation such as a logic exclusive OR (XOR) operation. In some examples, each encoding symbol may include information identifying the source symbols used to construct the encoding symbol. For example, the encoding symbol may include indices (e.g., $s_1$, $s_2$, $s_3$, $s_K$, etc.) associated with the source symbols used to construct the encoding symbol. The encoding symbols may be transmitted as the set of network encoded packets 320-a from the network entity 305 to the UEs 315. In some examples, the LT coding process may be represented by a generator matrix.

In some examples, one or more encoded packets may be lost based on the transmission environment. A UE 315 may receive a subset of the set of network encoded packets 320-a (e.g., a quantity N of encoded packets). The UE 315 may decode the received encoding symbols to obtain the source symbols. The UE 315 may begin a decoding process by identifying an encoding symbol with an index $t_j$ that is connected to a single source symbol with an index $s_i$. The UE 315 may determine the encoding symbol with index $t_j$ is equivalent to the source symbol with index $s_i$. The UE 315 may then apply an XOR operation to each other encoding symbol connected to the source symbol with index $s_i$, and remove all edges connected to the source symbol with index $s_i$. The UE 315 may repeat this process until each source symbol is determined from the received encoding symbols.

In some examples, the decoding process may fail if there is no encoding symbol connected to a single source symbol. Accordingly, the degree distribution D. of the encoding symbols received at the UE 315 may have a direct impact on the probability of successfully decoding source symbols transmitted in encoding symbols. For example, in a first degree distribution (which may in some examples be referred to as an ideal soliton distribution), the probability $\rho(i)$ of selecting a degree $d_i$ (where $d_i$ is an integer from 1 to K) may be defined by:

$$\rho(i) = \begin{cases} \frac{1}{K}, i = 1 \\ \frac{1}{i(i-1)}, i = 1, 2, \ldots, K \end{cases} \quad (1)$$

The first degree distribution may have a mode (e.g., a high probability) at $d_i=2$.

Alternatively, in a second degree distribution (which in some examples may be referred to as a robust soliton distribution), the probability of selecting the degree $d_i$ may be represented by $\mu(i)$ rather than $\rho(i)$ of the ideal soliton distribution. The probability $\mu(i)$ may be defined by:

$$\mu(i) = \frac{\rho(i) + \tau(i)}{\sum_{j=1}^{K} \rho(j) + \tau(j)}, \quad (2)$$

where $\tau(i)$ is a parameter defined in terms of constants c and $$R = c\sqrt{K} \ln\left(\frac{K}{\delta}\right),$$

as well as a decoding error probability $\delta$. The parameter $\tau(i)$ may be defined for various values of i as:

$$\tau(i) = \begin{cases} \frac{R}{iK}, i = 1, 2, \ldots, \frac{K}{R} - 1 \\ \frac{R}{K}\ln\left(\frac{R}{\delta}\right), i = \frac{K}{R} \\ 0, \text{otherwise}. \end{cases} \quad (3)$$

The robust soliton distribution may have a greater probability that a random $d_i=1$ than the ideal soliton distribution, which may reduce the probability of the decoding process failing by increasing the probability that an encoding symbol is connected to a single source symbol.

The encoding scheme described herein may enable the network entity 305 to improve efficiency and reliability of communications with the UEs 315 by increasing the probability of successfully decoding source symbols transmitted in encoding symbols.

Figure 4:
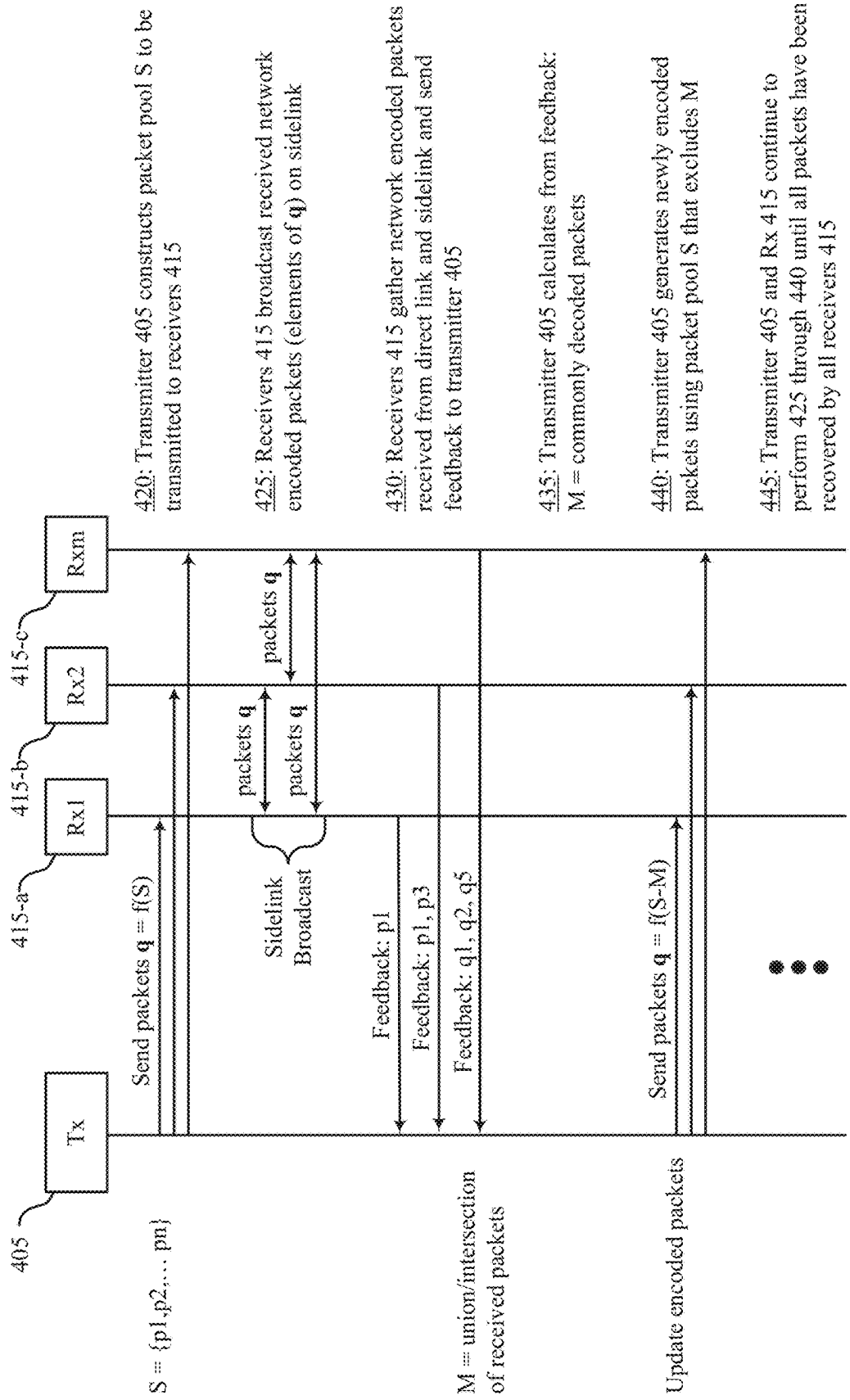
FIGS. 4 through 6 illustrate examples of process flows that support feedback-based broadcasting of network coded packets with sidelink in accordance with aspects of the present disclosure.

FIG. 4 illustrates an example of a process flow 400 that supports broadcasting packets using network coding via sidelink with feedback in accordance with aspects of the present disclosure. In some examples, the process flow 400 may implement aspects of wireless communications systems 100, 200, and 300. For example, the process flow 400 may include example operations associated with one or more of a transmitter 405 or a set of receivers 415, which may be examples of a base station and UEs, respectively, described with reference to FIGS. 1 through 3. The receivers 415 may be receivers 415 of a group of receivers 415 that includes m receivers 415. In the following description of the process flow 400, the operations between the transmitter 405 and the receivers 415 may be performed in a different order than the example order shown, or the operations performed by the transmitter 405 and the receivers 415 may be performed in different orders or at different times. Some operations may also be omitted from the process flow 400, and other operations may be added to the process flow 400. The operations performed by the transmitter 405 and the receivers 415 may support improvement to the transmitter 405 packet transmission operations and, in some examples, may promote improvements to efficiency and reliability for communications between the transmitter 405 and the receivers 415, among other benefits.

At 420, the transmitter 405 may construct a packet pool S={p1, p2, . . . , pn}. The set of network encoded packets may be encoded using a network encoding function q=f(S)= {q1, q2, . . . , qk} and the set of network encoded packets q may be transmitted to the receivers 415 (e.g., receivers 415-a, 415-b and 415-c). In some example, the set of network encoded packets q may be encoded using an LT code.

At 425, each receiver 415 may broadcast successfully received encoded packets via sidelink connections with the group of receivers 415. For example, the receiver 415-a may successfully receive network encoded packets q1 and q2 of the set q and broadcast q1 and q2 to the other receivers 415. Similarly, the receiver 415-b may successfully receive network encoded packets q2 and q3 and broadcast q2 and q3 to the other receivers 415. Likewise, the receiver 415-c may successfully receive network encoded packets q2 and q5 and may broadcast q2 and q5 to the other receivers 415.

At 430, each receiver 415 may gather network encoded packets received from the direct link and the sidelink connections. For example, the receiver 415-a may receive the broadcast from the receiver 415-b and may thus have received a first subset of network encoded packets {q1, q2, q3}. Similarly, the receiver 415-b may receive the broadcast from receiver 415-c and may thus have received a second subset of network encoded packets {q2, q3, q5}. Likewise, the receiver 415-c may receive the broadcast from receiver 415-a and may thus have received a third subset of network encoded packets {q1, q2, q5}.

Additionally, at 430, each receiver 415 may send feedback to the transmitter 405. In some examples, the feedback may indicate the packets successfully decoded by the receiver 415. For instance, receiver 415-a may decode packets q1, q2, and q3 to successfully determine p1 and receiver 415-b may decode packets q2, q3, and q5 to successfully determine p1 and p3. Receiver 415-a may transmit feedback to transmitter 405 indicating decoded packet p1 and receiver 415-b may transmit feedback to transmitter 405 indicating decoded packets p1 and p3. In some examples, the feedback may indicate the packets successfully received by the receiver 415. For instance, receiver 415-c may transmit feedback to transmitter 405 indicating that q1, q2, and q5 were successfully received.

At 435, transmitter 405 may determine a set of commonly decoded packets M among the receivers 415. For instance, from the feedback received from receivers 415-a (e.g., p1) and 415-b (e.g., p1 and p3), transmitter 405 may determine that receivers 415-a and 415-b have both obtained decoded packet p1. Additionally, even though the feedback received from receiver 415-c indicates packets successfully received by receiver 415-c (e.g., q1, q2, and q5), transmitter 405 may determine that these network encoded packets are decodable to produce p1. As such, transmitter 405 may determine that p1 has been decoded at each of the receivers 415 and, thus, M={p1}.

At 440, transmitter 405 may generate newly encoded packets using the packet pool S and M. For instance, the transmitter 405 may determine a set of network encoded packets according to f(S). The transmitter 405 may determine the newly encoded packets according to f(S')=f(S−M). In the present example, M may equal {p1}. As such, if S={p1, p2, . . . , pn}, then S' may equal {p2, . . . , pn} and the transmitter 405 may generate the newly encoded packets according to f(S').

At 445, transmitter 405 and the receivers 415 may continue to perform the operations described at 425 through 440 until the transmitter 405 infers (e.g., determines) all packets of the packet pool S have been successfully recovered by all receivers 415.

Figure 5:
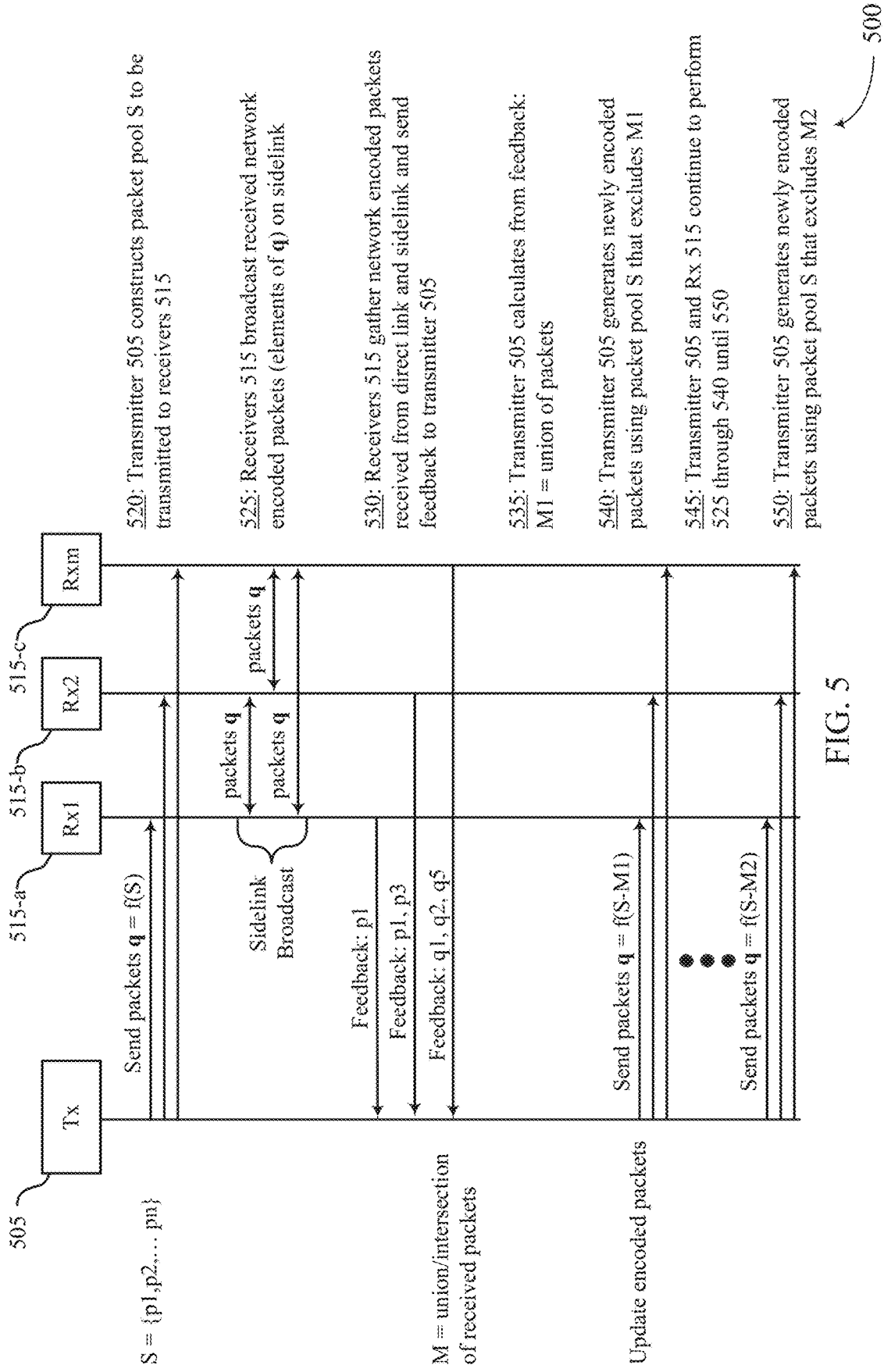

FIG. 5 illustrates an example of a process flow 500 that supports broadcasting packets using network coding via sidelink with feedback in accordance with aspects of the present disclosure. In some examples, the process flow 500 may implement aspects of wireless communications systems 100, 200, and 300. For example, the process flow 500 may include example operations associated with one or more of a transmitter 505 or a set of receivers 515, which may be examples of a base station and UEs, respectively, described with reference to FIGS. 1 through 3. The receivers 515 may be receivers 515 of a group of receivers 515 that includes m receivers 515. In the following description of the process flow 500, the operations between the transmitter 505 and the receivers 515 may be performed in a different order than the example order shown, or the operations performed by the transmitter 505 and the receivers 515 may be performed in different orders or at different times. Some operations may also be omitted from the process flow 500, and other operations may be added to the process flow 500. The operations performed by the transmitter 505 and the receivers 515 may support improvement to the transmitter 505 packet transmission operations and, in some examples, may promote improvements to efficiency and reliability for communications between the transmitter 505 and the receivers 515, among other benefits.

At 520, the transmitter 505 may construct a packet pool S={p1, p2, . . . , pn}. The set of network encoded packets may be encoded using a network encoding function q=f(S)= {q1, q2, . . . , qk} and the set of network encoded packets q may be transmitted to the receivers 515 (e.g., receivers 515-a, 515-b and 515-c). In some example, the set of network encoded packets q may be encoded using an LT code.

At 525, each receiver 515 may broadcast successfully received encoded packets via sidelink connections with the group of receivers 515. For example, the receiver 515-a may successfully receive network encoded packets q1 and q2 of the set q and broadcast q1 and q2 to the other receivers 515. Similarly, the receiver 515-b may successfully receive network encoded packets q2 and q3 and broadcast q2 and q3 to the other receivers 515. Likewise, the receiver 515-c may successfully receive network encoded packets q2 and q5 and may broadcast q2 and q5 to the other receivers 515.

At 530, each receiver 515 may gather network encoded packets received from the direct link and the sidelink connections. For example, the receiver 515-a may receive the broadcast from the receiver 515-b and may thus have received a first subset of network encoded packets {q1, q2, q3}. Similarly, the receiver 515-b may receive the broadcast from receiver 515-c and may thus have received a second subset of network encoded packets {q2, q3, q5}. Likewise, the receiver 515-c may receive the broadcast from receiver 515-a and may thus have received a third subset of network encoded packets {q1, q2, q5}.

Additionally, at 530, each receiver 515 may send feedback to the transmitter 505. In some examples, the feedback may indicate the packets successfully decoded by the receiver 515. For instance, receiver 515-a may decode packets q1, q2, and q3 to successfully determine p1 and receiver 515-b may decode packets q2, q3, and q5 to successfully determine p1 and p3. Receiver 515-a may transmit feedback to transmitter 505 indicating decoded packet p1 and receiver 515-b may transmit feedback to transmitter 505 indicating decoded packets p1 and p3. In some examples, the feedback may indicate the packets successfully received by the receiver 515. For instance, receiver 515-c may transmit feedback to transmitter 505 indicating that q1, q2, and q5 were successfully received.

At 535, transmitter 505 may determine a union of the decoded packets M1 among the receivers 515. For instance, from the feedback received from receivers 515-a (e.g., p1) and 515-b (e.g., p1 and p3), transmitter 505 may determine that a union of the decoded packets provided by receivers 515-a and 515-b is {p1, p3}. Additionally, even though the feedback received from receiver 515-c indicates packets successfully received by receiver 515-c (e.g., q1, q2, and q5), transmitter 505 may determine that these network encoded packets are decodable to produce p1. The union of the decodable packets at receiver 415-c with the decoded packets of receivers 515-a and 515-b may be {p1, p3} and thus M1 may equal {p1, p3}.

At 540, transmitter 505 may generate newly encoded packets using the packet pool S and M1. For instance, the transmitter 505 may determine a set of network encoded packets according to f(S). The transmitter 505 may determine the newly encoded packets according to f(S')=f(S−M1). In the present example, M1 may equal {p1, p3}. As such, if S={p1, p2, p3, p4, . . . , pn}, then S' may equal {p2, p4 . . . , pn} and the transmitter 505 may generate the newly encoded packets according to f(S').

At 545, transmitter 505 and the receivers 515 may continue to perform the operations described at 525 through 540 until S'={ } at 550.

At 550, in some examples, each of the packets in S may have been decoded at each of the receivers 415 considered together. However, there may be cases where a receiver 415 of the set of receivers 415 has not successfully decoded one or more of the packets in S, even though the packet has been successfully decoded by another of the set of receivers 415.

In such examples, transmitter 505 may determine M2, where M2 may be the set of commonly decoded packets among the receivers 415. Using S and M2, the transmitter 505 may determine S"=S−M2; may generate newly encoded packets according to f(S"); and may transmit the newly encoded packets via a broadcast transmission. Alternatively, transmitter 505 may transmit the packets that a receiver 415 has not decoded to the receiver directly via a unicast transmission directed to that receiver 415. Whether transmitter 505 transmits via broadcast signaling or unicast signaling may depend on a number of receivers 415 still missing packets. For instance, if the number of receivers 415 is above a threshold, transmitter 505 may transmit broadcast signaling according to f(S"). If the number of receivers 415 missing packets is below the threshold, transmitter 505 may transmit unicast signaling directed to receivers 415 missing the packets.

Figure 6:
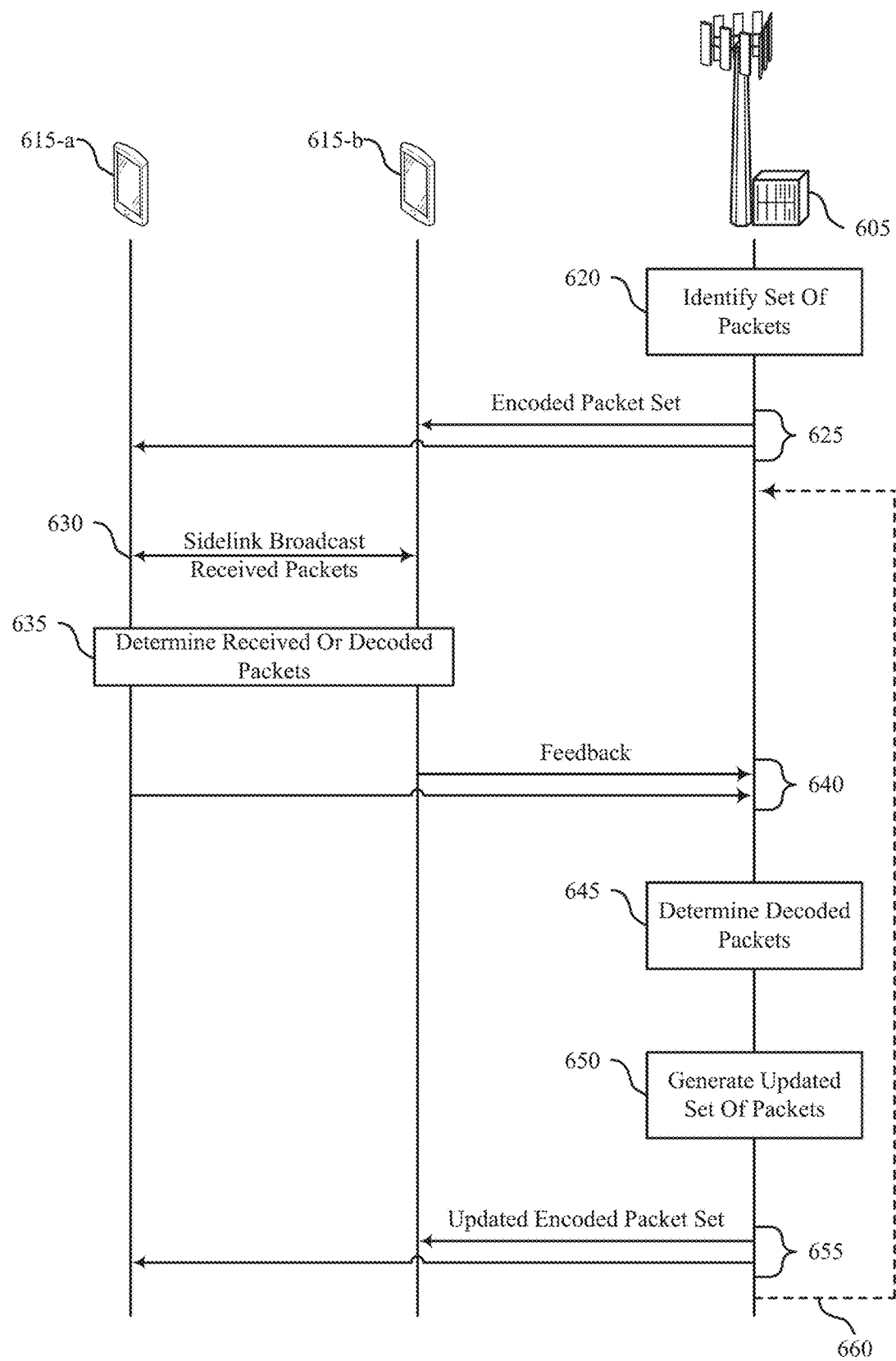

FIG. 6 illustrates an example of a process flow 600 that supports feedback-based broadcasting of network coded packets with sidelink in accordance with aspects of the present disclosure. In some examples, the process flow 600 may implement aspects of wireless communications systems 100, 200, and 300. For example, the process flow 600 may include example operations associated with one or more of a network entity 605 (e.g., a base station) or a set of UEs 615 (e.g., UEs 615-*a* and 615-*b*), which may be examples of the corresponding devices described with reference to FIGS. 1 through 3. In the following description of the process flow 500, the operations between the network entity 605 and the UEs 615 may be performed in a different order than the example order shown, or the operations performed by the network entity 605 and the UEs 615 may be performed in different orders or at different times. Some operations may also be omitted from the process flow 500, and other operations may be added to the process flow 500. The operations performed by the network entity 605 and the UEs 615 may support improvement to the network entity 605 packet transmission operations and, in some examples, may promote improvements to efficiency and reliability for communications between the network entity 605 and the UEs 615, among other benefits.

At 620, the network entity 605 may identify a set of packets for transmission to the UEs 615. In one example, the network entity 605 identifies the set of packets from a packet pool, which may be a set of packets scheduled for broadcasting. In some examples, the broadcasting may support a content streaming service and the packets may correspond to the streamed content. From the set of packets, the network entity 605 may encode (e.g., using LT coding) a set of network encoded packets.

At 625, the network entity 605 may broadcast the set of network encoded packets to the UEs 615. Each of the UEs 615 may receive one or more network encoded packets of the set of network encoded packets. For example, some network encoded packets may be lost based on a transmission environment. At 630, each UE 615 may broadcast successfully received encoded packets via sidelink connections with the group of UEs 615.

At 635, each UE 615 may gather network encoded packets received from the direct link and the sidelink connections to determine a respective subset of successfully received network encoded packets. At 640, the UEs 615 may each transmit feedback to the network entity 605 indicating the respective subset of successfully received network encoded packets or a respective subset of successfully decoded packets. As noted herein, the feedback may be an example of one or more HARQ messages. In other cases, the feedback may be an example of a PDCP status report or RLC status report. In some examples, the UEs 615 may transmit the feedback in the network coding sub-layer, and such feedback may directly indicate the receiving success/failure corresponding to each packet. In some cases, one or more of the UEs 615 may transmit a CSI report to facilitate MCS selection and/or rate control. In some examples, the CSI report is transmitted when a NACK is transmitted in order to request the updated MCS or data encoding rate for better data reception.

In some examples, the UEs 615 may decode the successfully received network encoded packets concurrent with transmitting feedback. As noted herein, one or more sets of network coding parameters may be configured at the UEs 615 (e.g., via MAC-CE or DCI). In some cases, one or more UEs 615 may request (e.g., along with transmitting feedback) an updated set of network coding parameters (e.g., via MAC-CE or UCI).

At 645, the network entity 605 may determine a subset of successfully decoded network encoded packets based on the feedback. In one example, the subset may represent successfully decoded packets included in each of the subsets (e.g., an intersection of the subsets of decoded packets). In another example, the subset may represent successfully decoded packets included in any of the subsets (e.g., a union of the subsets of decoded packets). At 650, the network entity 605 may generate newly encoded packets, for example using the packet pool.

At 655, the network entity may transmit an updated set of network encoded packets based on generating the newly encoded packets. The updated set of network encoded packets may not be generated according to the subset of decoded packets determined based on the feedback (e.g., the union or the intersection of the subsets indicated in or inferred (e.g., determined) according to the feedback).

At 660, the network entity 605 and the UEs 615 may continue to perform the operations described at 630 through 655 until the network entity 605 infers (e.g., determines) all packets of the packet pool have been successfully recovered by all receivers UEs 615 (e.g., based on decoding the successfully received network encoded packets indicated in the feedback). In cases where the subset of decoded packets determined by the network entity 605 is determined according to the union, the network entity 605 may switch to using the intersection once each packet has been successfully decoded at least receiver UE 115 or may transmit unicast signaling indicating the remaining missing packet to receiver UEs 115 still missing packets. The operations performed by the network entity 605 and the UEs 615 may support improvements to the network entity 605 packet transmission operations and, in some examples, may promote improvements to efficiency and reliability for communications between the network entity 605 and the UEs 615, among other benefits.

Figure 7:
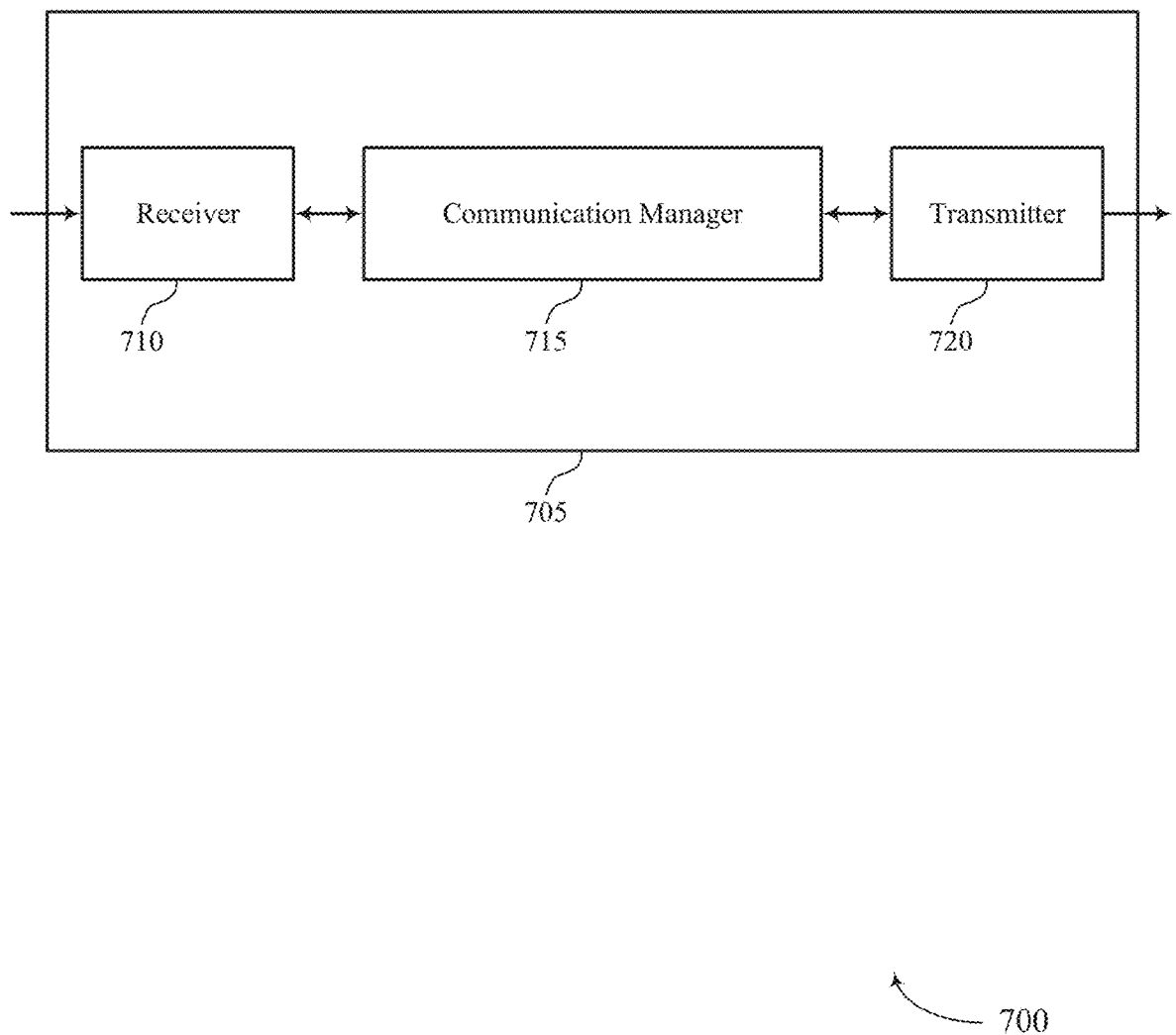
FIGS. 7 and 8 show block diagrams of devices that support feedback-based broadcasting of network coded packets with sidelink in accordance with aspects of the present disclosure.

FIG. 7 shows a block diagram 700 of a device 705 that supports feedback-based broadcasting of network coded packets with sidelink in accordance with aspects of the present disclosure. The device 705 may be an example of aspects of a UE 115 as described herein. The device 705 may include a receiver 710, a communication manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to feedback-based broadcasting of network coded packets with sidelink, etc.). Information may be passed on to other components of the device 705. The receiver 710 may be an example of aspects of the transceiver 1015 described with reference to FIG. 10. The receiver 710 may utilize a single antenna or a set of antennas.

The communication manager 715 may receive, as part of a broadcast from a network node, a first subset of one or more network encoded packets; receive, via a plurality of sidelink connections with a corresponding plurality of UEs, a second subset of one or more network encoded packets forwarded after successful receipt by the plurality of UEs from the network node; decode the first subset of one or more network encoded packets and the second subset of one or more network encoded packets; and determine, based on the decoding, a set of one or more successfully decoded packets from the network node. The communication manager 715 may be an example of aspects of the communication manager 1010 described herein.

The communication manager 715, or its sub-components, may be implemented in hardware, code (e.g., software or firmware) executed by a processor, or any combination thereof. If implemented in code executed by a processor, the functions of the communication manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 715, or its sub-components, may be physically located at various positions, including being distributed such that portions of functions are implemented at different physical locations by one or more physical components. In some examples, the communication manager 715, or its sub-components, may be a separate and distinct component in accordance with various aspects of the present disclosure. In some examples, the communication manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1015 described with reference to FIG. 10. The transmitter 720 may utilize a single antenna or a set of antennas.

By including or configuring the communication manager 715 in accordance with examples as described herein, the device 705 (e.g., a processor controlling or otherwise coupled to the receiver 710, the transmitter 720, the communication manager 715, or a combination thereof) may support techniques for the device 705 to reduce waste and duplication of packets by communicating successfully received and decoded packets with other devices (e.g., other UEs 115) and providing feedback that enables a base station to retransmit packets that have not been received at the device 705 and the other devices (e.g., other UEs 115).

Figure 8:
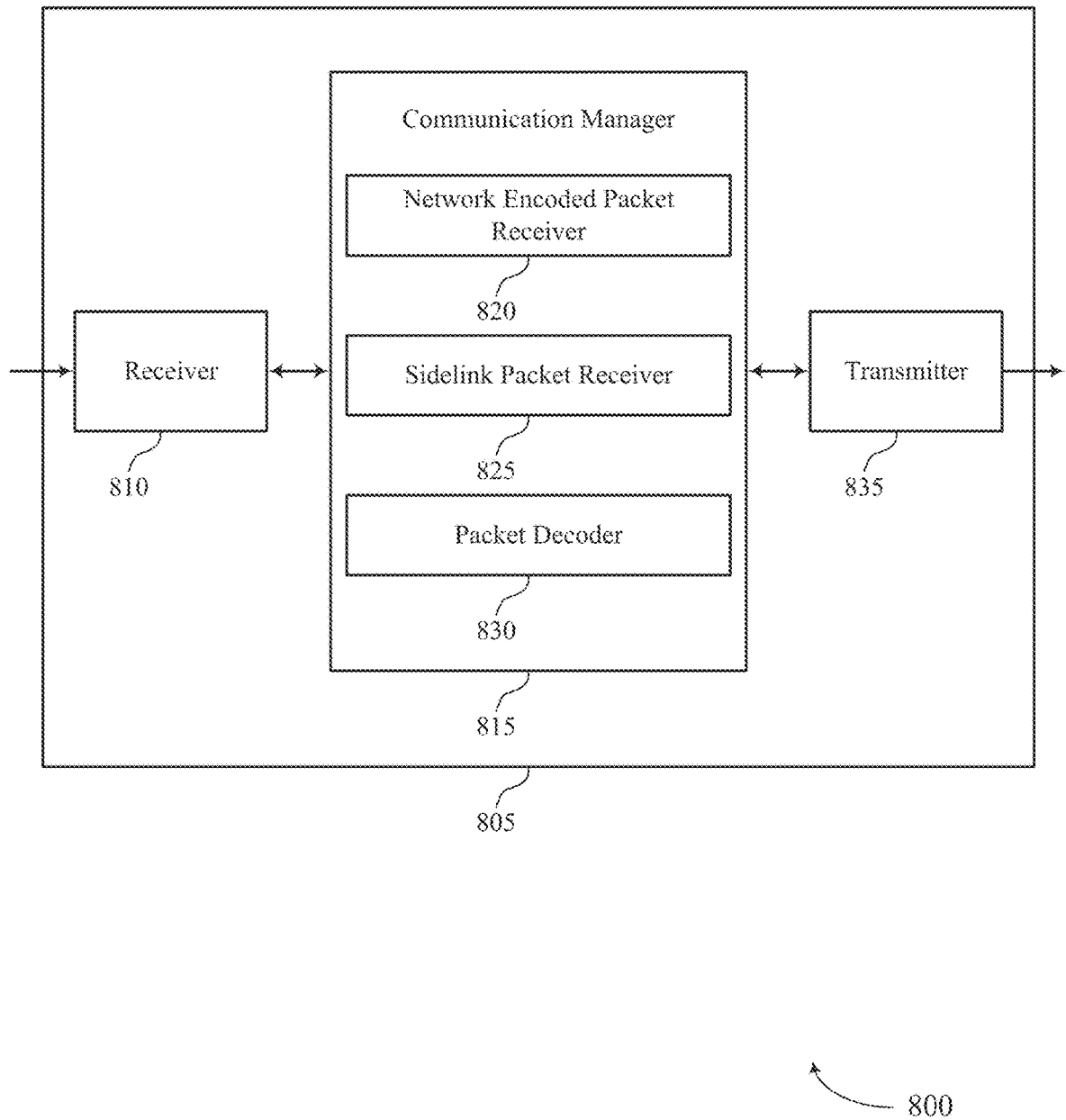

FIG. 8 shows a block diagram 800 of a device 805 that supports feedback-based broadcasting of network coded packets with sidelink in accordance with aspects of the present disclosure. The device 805 may be an example of aspects of a device 705, or a UE 115 as described herein. The device 805 may include a receiver 810, a communication manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to feedback-based broadcasting of network coded packets with sidelink, etc.). Information may be passed on to other components of the device 805. The receiver 810 may be an example of aspects of the transceiver 1015 described with reference to FIG. 10. The receiver 810 may utilize a single antenna or a set of antennas.

The communication manager 815 may be an example of aspects of the communication manager 715 as described herein. The communication manager 815 may include a network encoded packet receiver 820, a sidelink packet receiver 825, and a packet decoder 830. The communication manager 815 may be an example of aspects of the communication manager 1010 described herein.

The network encoded packet receiver 820 may receive, as part of a broadcast from a network node, a first subset of one or more network encoded packets.

The sidelink packet receiver 825 may receive, via a plurality of sidelink connections with a corresponding plurality of UEs, a second subset of one or more network encoded packets forwarded after successful receipt by the plurality of UEs from the network node.

The packet decoder 830 may decode the first subset of one or more network encoded packets and the second subset of one or more network encoded packets and determine, based on the decoding, a set of one or more successfully decoded packets from the network node.

The transmitter 835 may transmit signals generated by other components of the device 805. In some examples, the transmitter 835 may be collocated with a receiver 810 in a transceiver module. For example, the transmitter 835 may be an example of aspects of the transceiver 1015 described with reference to FIG. 10. The transmitter 835 may utilize a single antenna or a set of antennas.

Figure 9:
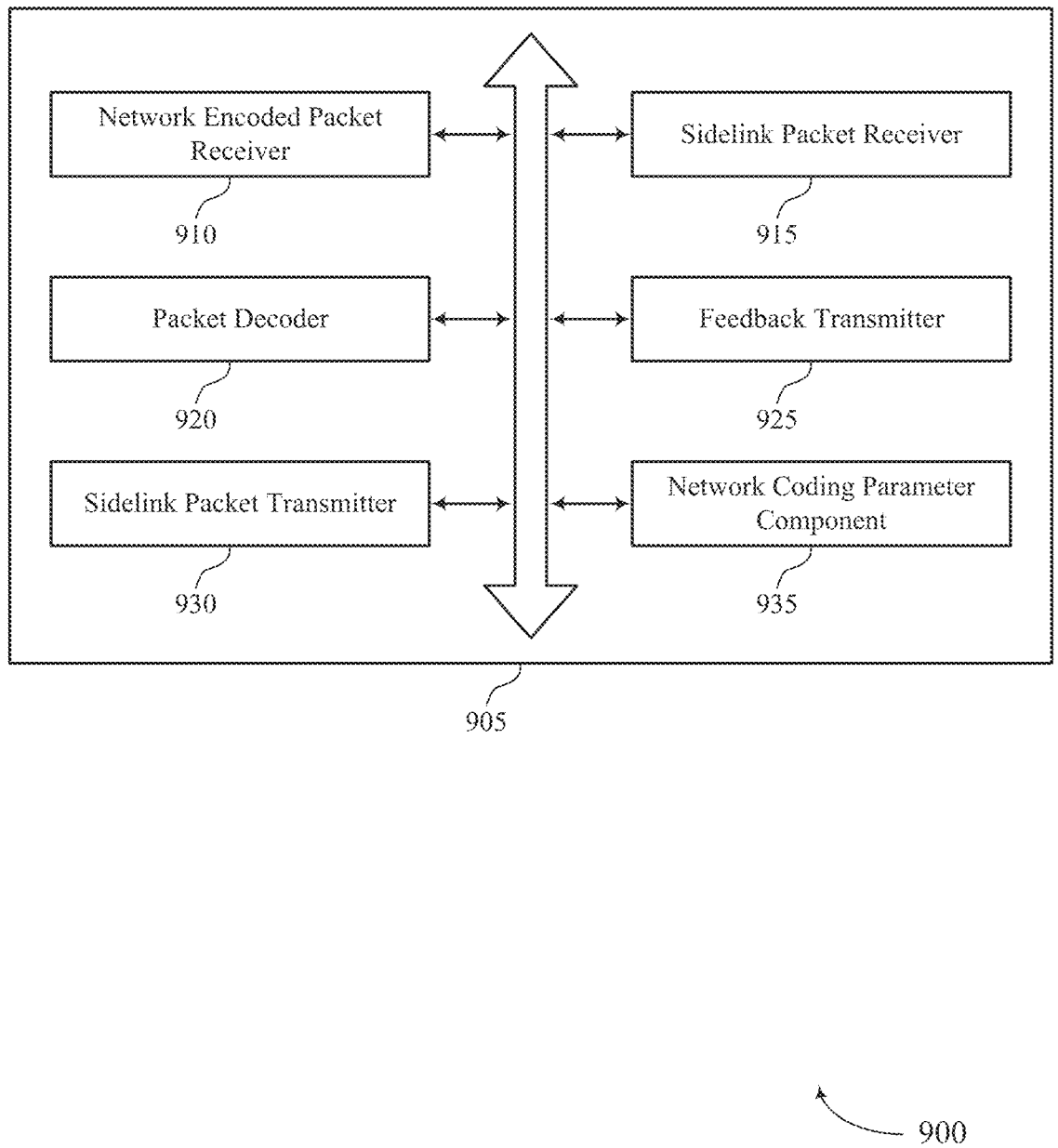
FIG. 9 shows a block diagram of a communication manager that supports feedback-based broadcasting of network coded packets with sidelink in accordance with aspects of the present disclosure.

FIG. 9 shows a block diagram 900 of a communication manager 905 that supports feedback-based broadcasting of network coded packets with sidelink in accordance with aspects of the present disclosure. The communication manager 905 may be an example of aspects of a communication manager 715, a communication manager 815, or a communication manager 1010 described herein. The communication manager 905 may include a network encoded packet receiver 910, a sidelink packet receiver 915, a packet decoder 920, a feedback transmitter 925, a sidelink packet transmitter 930, and a network coding parameter component 935. Each of these modules may communicate, directly or indirectly, with one another (e.g., via one or more buses).

The network encoded packet receiver 910 may receive, as part of a broadcast from a network node, a first subset of one or more network encoded packets. In some examples, the network encoded packet receiver 910 may receive a third subset of one or more network encoded packets from the network node based on transmitting feedback to the network node, where the third subset of one or more network encoded packets is different from the first subset of one or more network encoded packets and the second subset of one or more network encoded packets. In some examples, the third subset of one or more network encoded packets is provided via broadcast signaling. In some examples, the third subset of one or more network encoded packets is provided via unicast signaling.

The sidelink packet receiver 915 may receive, via a plurality of sidelink connections with a corresponding plurality of UEs, a second subset of one or more network encoded packets forwarded after successful receipt by the plurality of UEs from the network node.

The packet decoder 920 may decode the first subset of one or more network encoded packets and the second subset of one or more network encoded packets. In some examples, the packet decoder 920 may determine, based on the decoding, a set of one or more successfully decoded packets from the network node.

The feedback transmitter 925 may transmit feedback to the network node, where the feedback indicates the first and second subsets of network encoded packets or the set of one or more successfully decoded packets. In some examples, the feedback transmitter 925 may transmit a channel state information message in conjunction with transmitting feedback to the network node. In some examples, the feedback transmitter 925 may transmit feedback to the network node via a packet data convergence protocol (PDCP) status report, a RLC status report, or a HARQ message. In some examples, the feedback transmitter 925 may transmit feedback to the network node in a network coding sub-layer, where the feedback indicates a decoding status of each packet of the set of one or more successfully decoded packets. In some cases, the feedback includes at least one negative acknowledgement message, at least one acknowledgement message, or both.

The sidelink packet transmitter 930 may transmit the first subset of one or more network encoded packets to a plurality of UEs via a plurality of sidelink connections.

The network coding parameter component 935 may receive an indication of one or more network coding parameters, the one or more network coding parameters including a network coding algorithm, a network encoding function, a network encoding matrix, a number of decoding iterations, or any combination thereof. In some examples, the network coding parameter component 935 may receive the one or more network coding parameters using medium access control (MAC) control element signaling, downlink control information signaling, radio resource control signaling, or any combination thereof. In some examples, the network coding parameter component 935 may receive an indication to switch from one or more prior network coding parameters to the one or more network coding parameters. In some examples, the network coding parameter component 935 may transmit, to the network node, a request for the one or more network coding parameters, where the indication of the one or more network coding parameters is received based on transmitting the request. In some examples, the network coding parameter component 935 may transmit the request using medium access control (MAC) control element signaling or uplink control information signaling.

Figure 10:
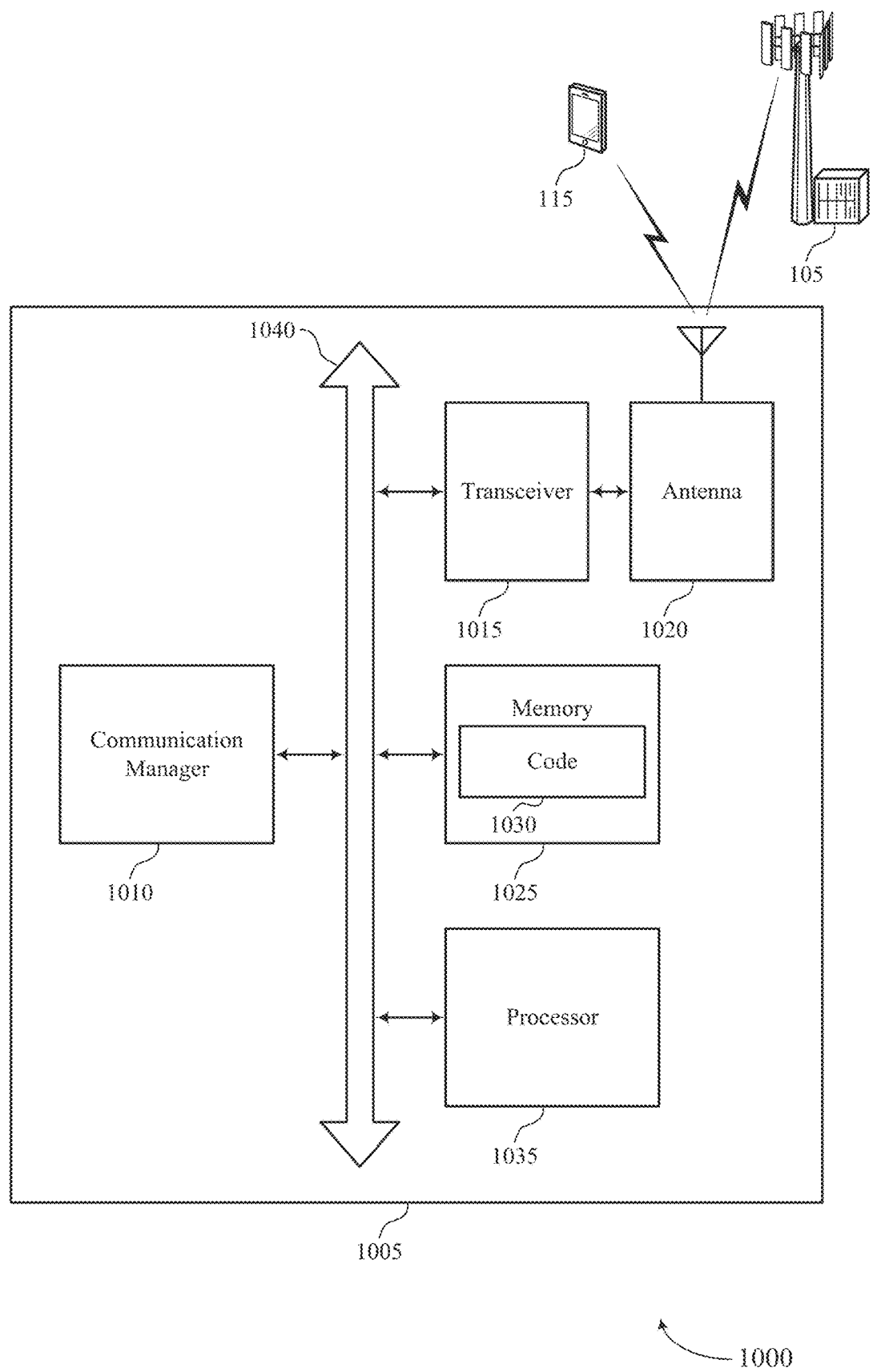
FIG. 10 shows a diagram of a system including a device that supports feedback-based broadcasting of network coded packets with sidelink in accordance with aspects of the present disclosure.

FIG. 10 shows a diagram of a system 1000 including a device 1005 that supports feedback-based broadcasting of network coded packets with sidelink in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communication manager 1010, a transceiver 1015, an antenna 1020, memory 1025, and a processor 1035. These components may be in electronic communication via one or more buses (e.g., bus 1040).

The communication manager 1010 may receive, as part of a broadcast from a network node, a first subset of one or more network encoded packets; receive, via a plurality of sidelink connections with a corresponding plurality of UEs, a second subset of one or more network encoded packets forwarded after successful receipt by the plurality of UEs from the network node; decode the first subset of one or more network encoded packets and the second subset of one or more network encoded packets; and determine, based on the decoding, a set of one or more successfully decoded packets from the network node.

The transceiver 1015 may communicate bi-directionally, via one or more antennas, wired, or wireless links as described above. For example, the transceiver 1015 may represent a wireless transceiver and may communicate bi-directionally with another wireless transceiver. The transceiver 1015 may also include a modem to modulate the packets and provide the modulated packets to the antennas for transmission, and to demodulate packets received from the antennas.

In some cases, the wireless device may include a single antenna 1020. However, in some cases the device may have more than one antenna 1020, which may be capable of concurrently transmitting or receiving multiple wireless transmissions.

The memory 1025 may include random-access memory (RAM) and read-only memory (ROM). The memory 1025 may store computer-readable, computer-executable code 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

The code 1030 may include instructions to implement aspects of the present disclosure, including instructions to support wireless communications. The code 1030 may be stored in a non-transitory computer-readable medium such as system memory or other type of memory. In some cases, the code 1030 may not be directly executable by the processor 1035 but may cause a computer (e.g., when compiled and executed) to perform functions described herein.

The processor 1035 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1035 may be configured to operate a memory array using a memory controller. In other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting feedback-based broadcasting of network coded packets with sidelink).

By including or configuring the communication manager 1010 in accordance with examples as disclosed herein, the device 1005 may support techniques for the device 1005 to reduce waste and duplication of packets by communicating successfully received and decoded packets with other devices (e.g., other UEs 115) and providing feedback that enables a base station to retransmit packets that have not been received at the device 1005 and the other devices (e.g., other UEs 115).

Figure 11:
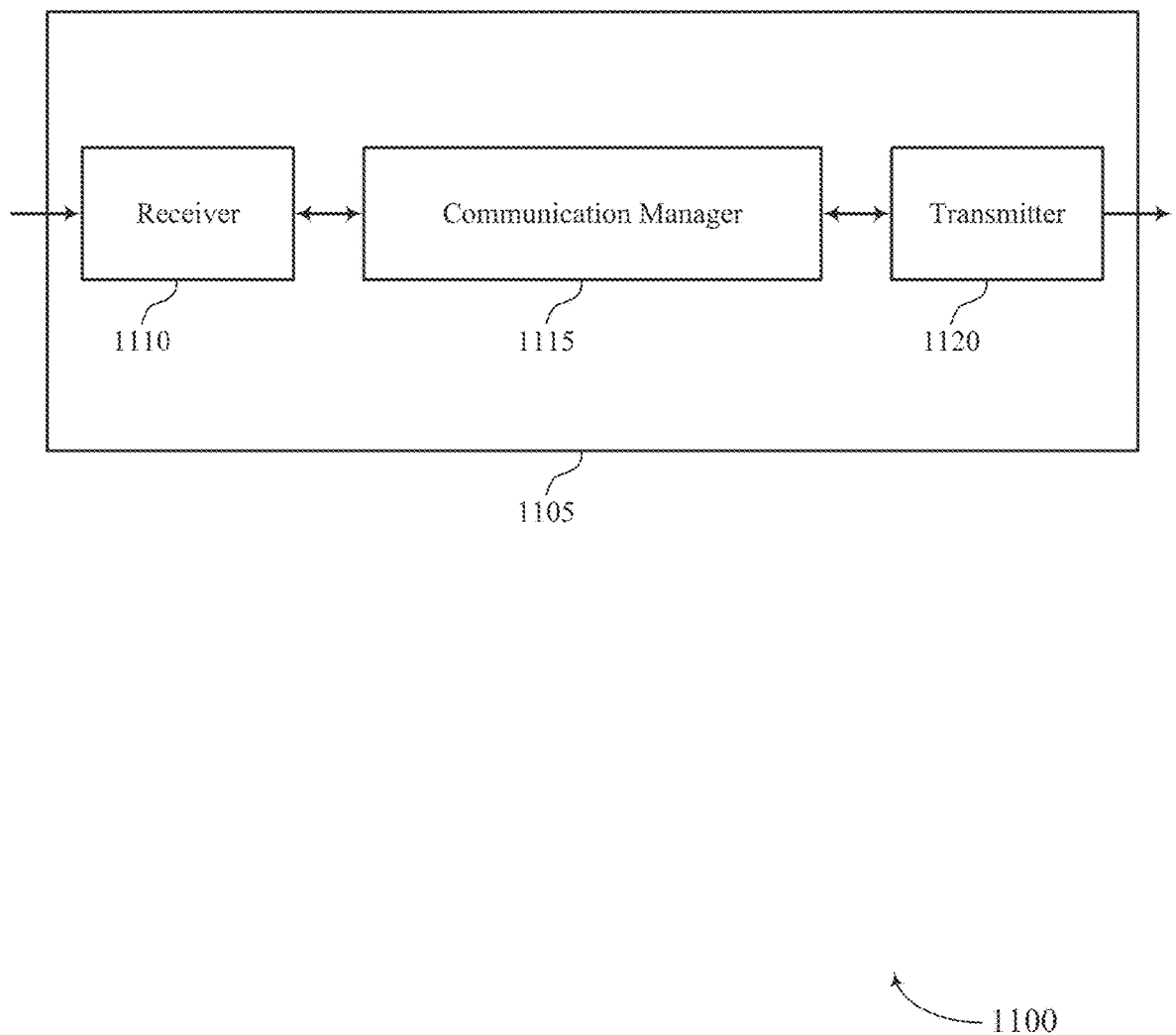
FIGS. 11 and 12 show block diagrams of devices that support feedback-based broadcasting of network coded packets with sidelink in accordance with aspects of the present disclosure.

FIG. 11 shows a block diagram 1100 of a device 1105 that supports feedback-based broadcasting of network coded packets with sidelink in accordance with aspects of the present disclosure. The device 1105 may be an example of aspects of a base station 105 as described herein. The device 1105 may include a receiver 1110, a communication manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback-based broadcasting of network coded packets with sidelink, etc.). Information may be passed on to other components of the device 1105. The receiver 1110 may be an example of aspects of the transceiver 1420 described with reference to FIG. 14. The receiver 1110 may utilize a single antenna or a set of antennas.

The communication manager 1115 may transmit, to a plurality of UEs, a set of one or more network encoded packets representing a set of one or more packets identified for broadcast to the plurality of UEs; receive feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets; determine, based on the feedback, a subset of the set of one or more network encoded packets that was successfully decoded for each of the one or more of the plurality of UEs providing feedback; generate, based on the feedback, an updated set of one or more network encoded packets based on an updated set of one or more packets, where the updated set of one or more packets excludes successfully decoded packets included in each of the subsets; and transmit the updated set of one or more network encoded packets to the plurality of UEs. The communication manager 1115 may be an example of aspects of the communication manager 1410 described herein.

The communication manager 1115, or its sub-components, may be implemented in hardware, code (e.g., software or firmware) executed by a processor, or any combination thereof. If implemented in code executed by a processor, the functions of the communication manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1115, or its sub-components, may be physically located at various positions, including being distributed such that portions of functions are implemented at different physical locations by one or more physical components. In some examples, the communication manager 1115, or its sub-components, may be a separate and distinct component in accordance with various aspects of the present disclosure. In some examples, the communication manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

By including or configuring the communication manager 1115 in accordance with examples as described herein, the device 1105 (e.g., a processor controlling or otherwise coupled to the receiver 1110, the transmitter 1120, the communication manager 1115, or a combination thereof) may support techniques for the device 1105 to reduce waste and duplication of packets by receiving feedback from multiple UEs 115 and excluding successfully decoded packets from a set of packets retransmitted to the multiple UEs 115 in response to the feedback.

Figure 12:
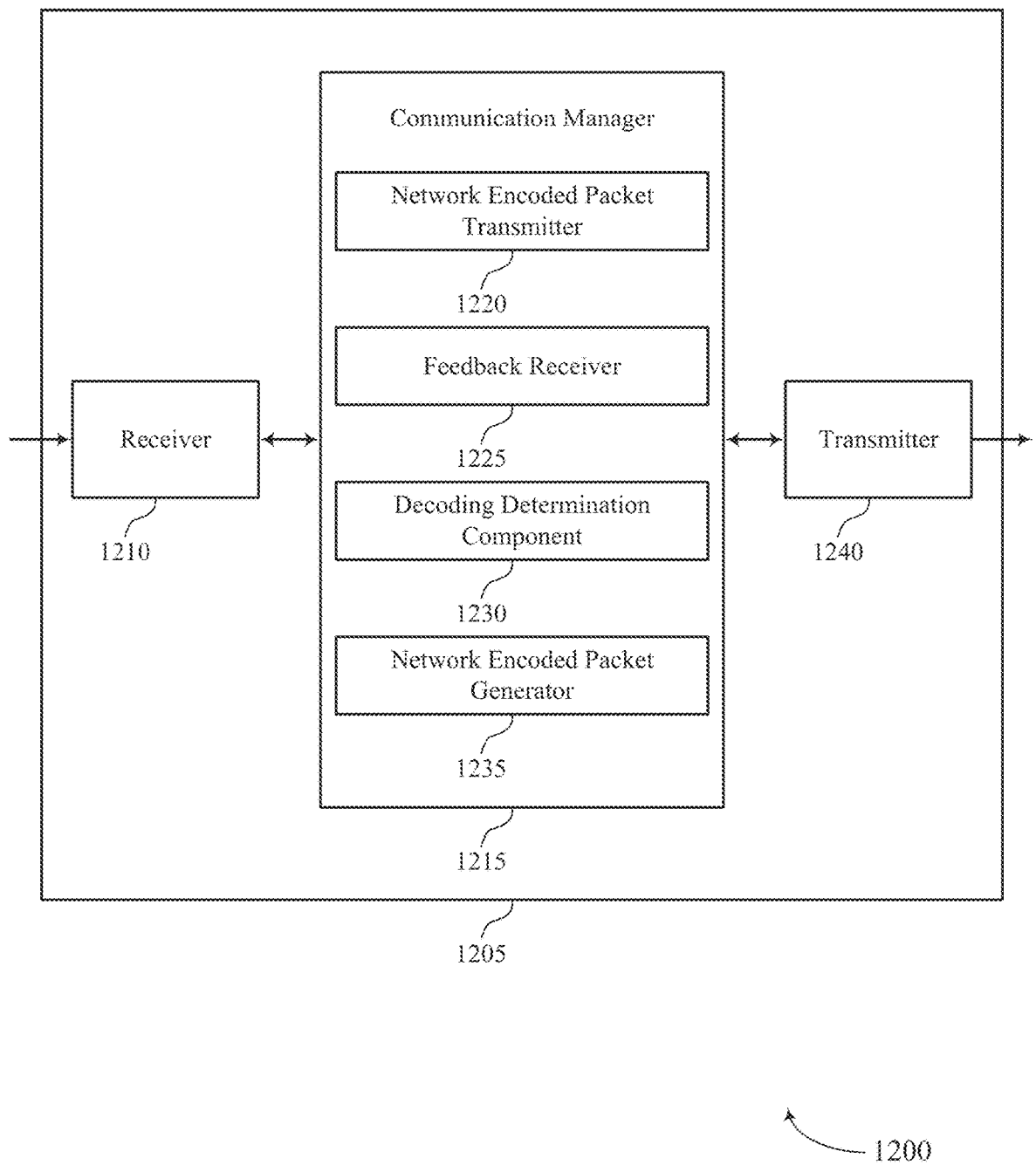

FIG. 12 shows a block diagram 1200 of a device 1205 that supports feedback-based broadcasting of network coded packets with sidelink in accordance with aspects of the present disclosure. The device 1205 may be an example of aspects of a device 1105, or a base station 105 as described herein. The device 1205 may include a receiver 1210, a communication manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to feedback-based broadcasting of network coded packets with sidelink, etc.). Information may be passed on to other components of the device 1205. The receiver 1210 may be an example of aspects of the transceiver 1420 described with reference to FIG. 14. The receiver 1210 may utilize a single antenna or a set of antennas.

The communication manager 1215 may be an example of aspects of the communication manager 1115 as described herein. The communication manager 1215 may include a network encoded packet transmitter 1220, a feedback receiver 1225, a decoding determination component 1230, and a network encoded packet generator 1235. The communication manager 1215 may be an example of aspects of the communication manager 1410 described herein.

The network encoded packet transmitter 1220 may transmit, to a plurality of UEs, a set of one or more network encoded packets representing a set of one or more packets identified for broadcast to the plurality of UEs and transmit the updated set of one or more network encoded packets to the plurality of UEs.

The network encoded packet generator 1235 may generate, based on the feedback, an updated set of one or more network encoded packets based on an updated set of one or more packets, where the updated set of one or more packets excludes successfully decoded packets included in each of the subsets.

The decoding determination component 1230 may determine, based on the feedback, a subset of the set of one or more network encoded packets that was successfully decoded for each of the one or more of the plurality of UEs providing feedback.

The feedback receiver 1225 may receive feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
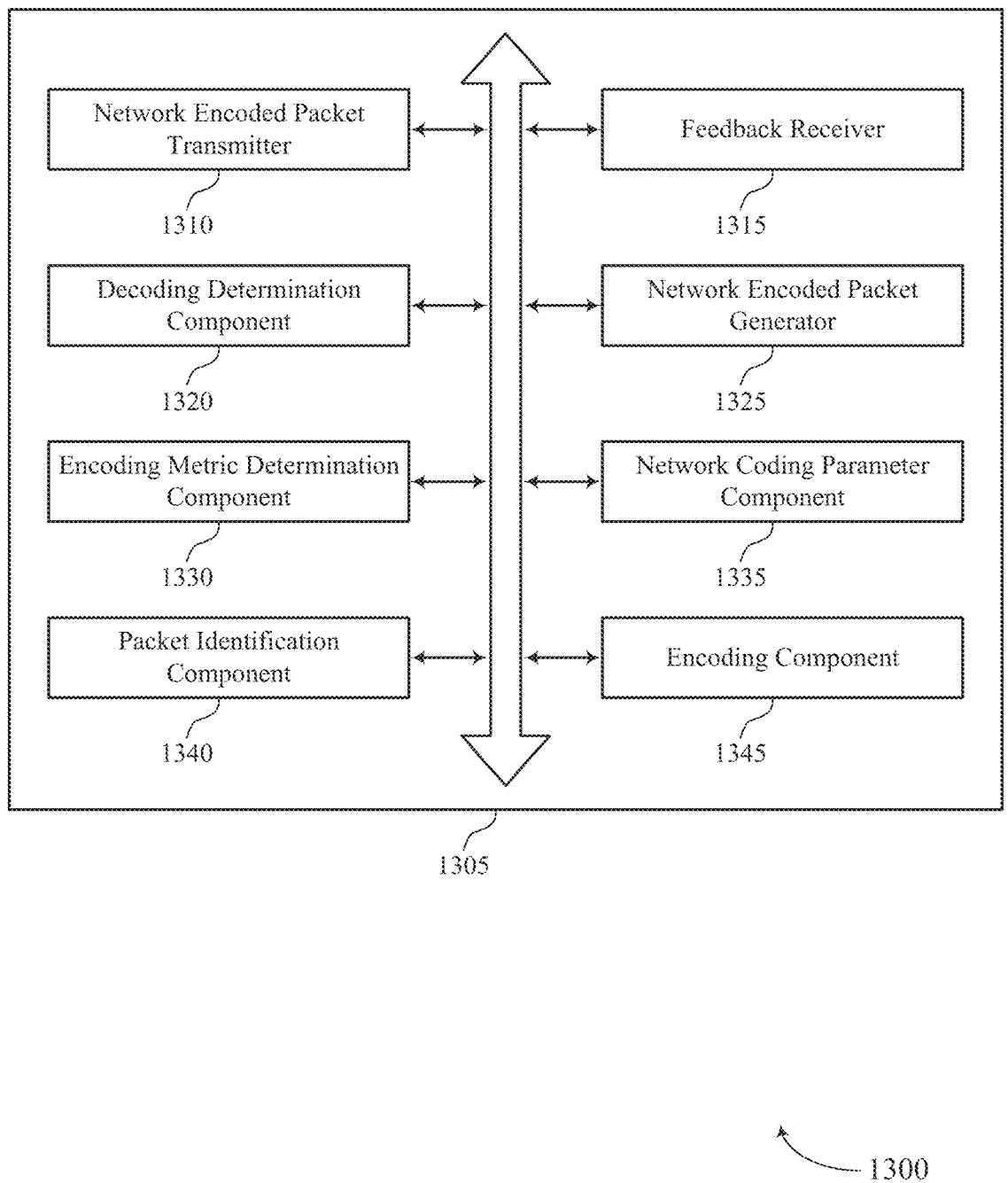
FIG. 13 shows a block diagram of a communication manager that supports feedback-based broadcasting of network coded packets with sidelink in accordance with aspects of the present disclosure.

FIG. 13 shows a block diagram 1300 of a communication manager 1305 that supports feedback-based broadcasting of network coded packets with sidelink in accordance with aspects of the present disclosure. The communication manager 1305 may be an example of aspects of a communication manager 1115, a communication manager 1215, or a communication manager 1410 described herein. The communication manager 1305 may include a network encoded packet transmitter 1310, a feedback receiver 1315, a decoding determination component 1320, a network encoded packet generator 1325, an encoding metric determination component 1330, a network coding parameter component 1335, a packet identification component 1340, and an encoding component 1345. Each of these modules may communicate, directly or indirectly, with one another (e.g., via one or more buses).

The network encoded packet transmitter 1310 may transmit, to a plurality of UEs, a set of one or more network encoded packets representing a set of one or more packets identified for broadcast to the plurality of UEs. In some examples, the network encoded packet transmitter 1310 may transmit the updated set of one or more network encoded packets to the plurality of UEs. In some examples, the network encoded packet transmitter 1310 may continue to update and transmit the updated set of one or more network encoded packets based on additional feedback received from the one or more of the plurality of UEs until the updated set of one or more network encoded packets is empty. In some examples, the network encoded packet transmitter 1310 may transmit the updated set of one or more network encoded packets via broadcast signaling based on a number of the plurality of UEs that have failed to decode each packet of the set of one or more network encoded packets being above a threshold amount. In some examples, the network encoded packet transmitter 1310 may transmit the updated set of one or more network encoded packets via unicast signaling based on a number of the plurality of UEs that have failed to decode each packet of the set of one or more network encoded packets being below a threshold amount.

The feedback receiver 1315 may receive feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets. In some examples, the feedback receiver 1315 may receive the feedback via a packet data convergence protocol (PDCP) status report, a RLC status report, or a HARQ message. In some examples, the feedback receiver 1315 may receive the feedback in a network coding sub-layer, where the feedback indicates a decoding status of each packet of the set of one or more packets. In some examples, the feedback receiver 1315 may receive a channel state information message in conjunction with the feedback. In some examples, the feedback receiver 1315 may receive the channel state information message based on the feedback indicating a negative acknowledgement for one or more of the set of one or more network encoded packets.

The decoding determination component 1320 may determine, based on the feedback, a subset of the set of one or more network encoded packets that was successfully decoded for each of the one or more of the plurality of UEs providing feedback. In some examples, the decoding determination component 1320 may determine which of the successfully received network encoded packets were successfully decoded so as to be added to the successfully decoded packets. In some examples, the decoding determination component 1320 may determine an intersection the successfully decoded packets associated with each of the subsets indicated in the feedback to identify the successfully decoded packets common to each of the subsets. In some examples, the decoding determination component 1320 may determine, based on the feedback indicative of the successfully received network encoded packets, the successfully decoded network encoded packets, or both a second subset of the set of one or more network encoded packets that was successfully decoded at any of the one or more of the plurality of UEs providing feedback, where the updated set of one or more network encoded packets further excludes the second subset of the set of one or more network encoded packets. In some examples, the decoding determination component 1320 may determine a union of the successfully decoded packets associated with each of the subsets indicated in the feedback to identify the second subset of the set of one or more network encoded packets.

The network encoded packet generator 1325 may generate, based on the feedback, an updated set of one or more network encoded packets based on an updated set of one or more packets, where the updated set of one or more packets excludes successfully decoded packets included in each of the subsets.

The encoding metric determination component 1330 may determine one or more encoding metrics for transmission of the updated set of one or more packets based on the channel state information message. In some examples, the encoding metric determination component 1330 may determine a modulation and coding scheme, an encoding rate, or both.

The network coding parameter component 1335 may transmit, to one or more of the plurality of UEs, an indication of one or more network coding parameters, where at least the updated set of one or more network encoded packets are transmitted to the plurality of UEs in accordance with the one or more network coding parameters. In some examples, the network coding parameter component 1335 may transmit an indication of a network coding algorithm, a network encoding function, a network encoding matrix, a number of decoding iterations, or any combination thereof. In some examples, the network coding parameter component 1335 may transmit the one or more network coding parameters using medium access control-control element (MAC-CE) signaling, downlink control information signaling, radio resource control signaling, or any combination thereof. In some examples, the network coding parameter component 1335 may transmit an indication to switch from one or more prior network coding parameters to the one or more network coding parameters. In some examples, the network coding parameter component 1335 may receive, from the one or more of the plurality of UEs, a request for the one or more network coding parameters, where the indication of the one or more network coding parameters is transmitted based on receiving the request. In some examples, the network coding parameter component 1335 may receive, the request using medium access control-control element (MAC-CE) signaling or uplink control information signaling.

The packet identification component 1340 may identify the set of one or more packets from a packet pool scheduled for broadcast to the plurality of UEs. In some examples, the packet identification component 1340 may identify one or more additional packets for broadcast to the plurality of UEs based on the one or more additional packets being added to the packet pool.

The encoding component 1345 may encode the set of one or more network encoded packets according to a Luby transform (LT) code, where each network encoded packet of the set of one or more network encoded packets is constructed from one or more packets of the set of one or more packets identified for broadcast to the plurality of UEs according to a distribution. In some cases, the distribution includes an ideal soliton distribution, a robust soliton distribution, or any combination thereof.

Figure 14:
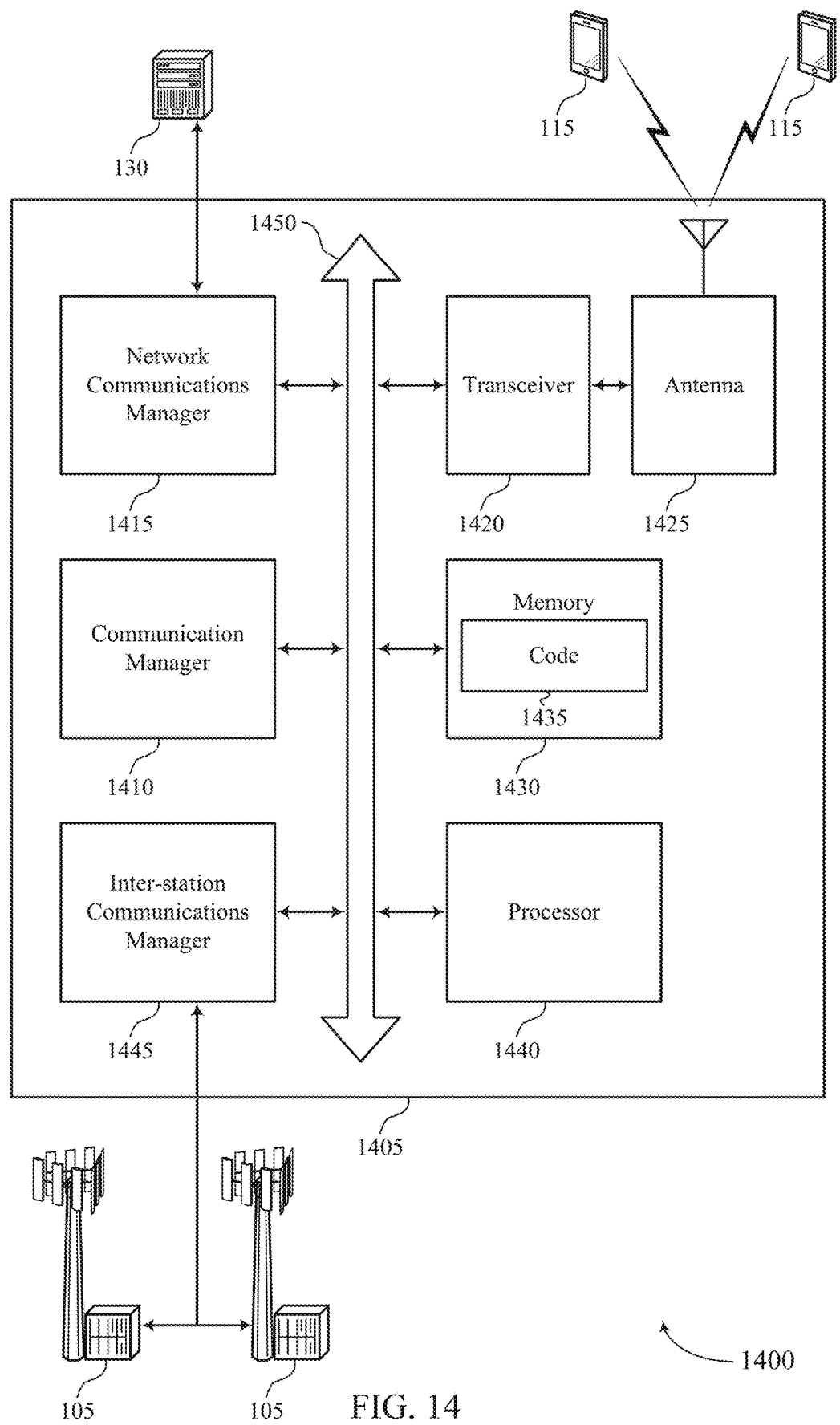
FIG. 14 shows a diagram of a system including a device that supports feedback-based broadcasting of network coded packets with sidelink in accordance with aspects of the present disclosure.

FIG. 14 shows a diagram of a system 1400 including a device 1405 that supports feedback-based broadcasting of network coded packets with sidelink in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communication manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communication manager 1410 may transmit, to a plurality of UEs, a set of one or more network encoded packets representing a set of one or more packets identified for broadcast to the plurality of UEs; receive feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets; determine, based on the feedback, a subset of the set of one or more network encoded packets that was successfully decoded for each of the one or more of the plurality of UEs providing feedback; generate, based on the feedback, an updated set of one or more network encoded packets based on an updated set of one or more packets, where the updated set of one or more packets excludes successfully decoded packets included in each of the subsets; and transmit the updated set of one or more network encoded packets to the plurality of UEs.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting feedback-based broadcasting of network coded packets with sidelink).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

By including or configuring the communication manager 1410 in accordance with examples as disclosed herein, the device 1405 may support techniques for the device 1405 to reduce waste and duplication of packets by receiving feedback from multiple UEs 115 and excluding successfully decoded packets from a set of one or more packets retransmitted to the multiple UEs 115 in response to the feedback.

Figure 15:
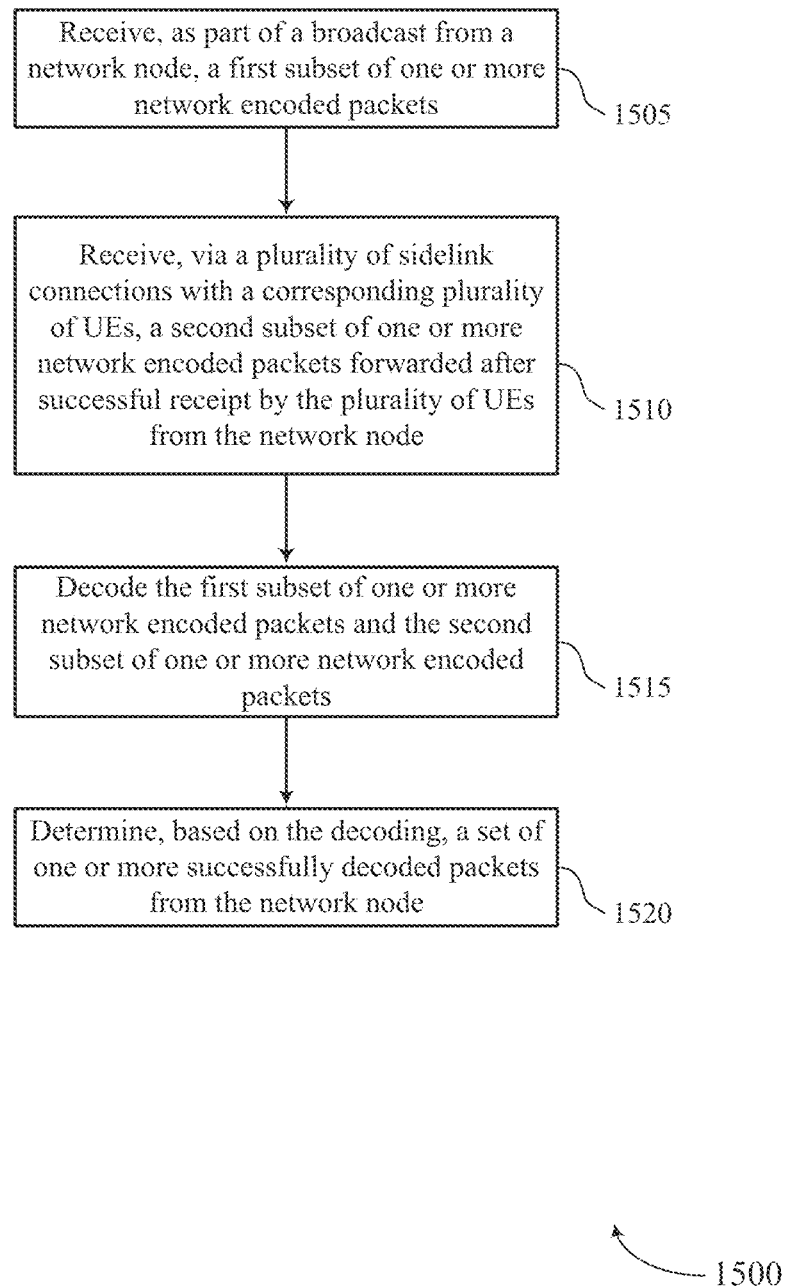
FIGS. 15 through 18 show flowcharts illustrating methods that support feedback-based broadcasting of network coded packets with sidelink in accordance with aspects of the present disclosure.

FIG. 15 shows a flowchart illustrating a method 1500 that supports feedback-based broadcasting of network coded packets with sidelink in accordance with aspects of the present disclosure. The operations of method 1500 may be implemented by a UE 115 or its components as described herein. For example, the operations of method 1500 may be performed by a communication manager as described with reference to FIGS. 7 through 10. In some examples, a UE may execute a set of instructions to control the functional elements of the UE to perform the described functions.

Additionally or alternatively, a UE may perform aspects of the described functions using special-purpose hardware.

At 1505, the UE may receive, as part of a broadcast from a network node, a first subset of one or more network encoded packets. The operations of 1505 may be performed according to the methods described herein. In some examples, aspects of the operations of 1505 may be performed by a network encoded packet receiver as described with reference to FIGS. 7 through 10.

At 1510, the UE may receive, via a plurality of sidelink connections with a corresponding plurality of UEs, a second subset of one or more network encoded packets forwarded after successful receipt by the plurality of UEs from the network node. The operations of 1510 may be performed according to the methods described herein. In some examples, aspects of the operations of 1510 may be performed by a sidelink packet receiver as described with reference to FIGS. 7 through 10.

At 1515, the UE may decode the first subset of one or more network encoded packets and the second subset of one or more network encoded packets. The operations of 1515 may be performed according to the methods described herein. In some examples, aspects of the operations of 1515 may be performed by a packet decoder as described with reference to FIGS. 7 through 10.

At 1520, the UE may determine, based on the decoding, a set of one or more successfully decoded packets from the network node. The operations of 1520 may be performed according to the methods described herein. In some examples, aspects of the operations of 1520 may be performed by a packet decoder as described with reference to FIGS. 7 through 10.

Figure 16:
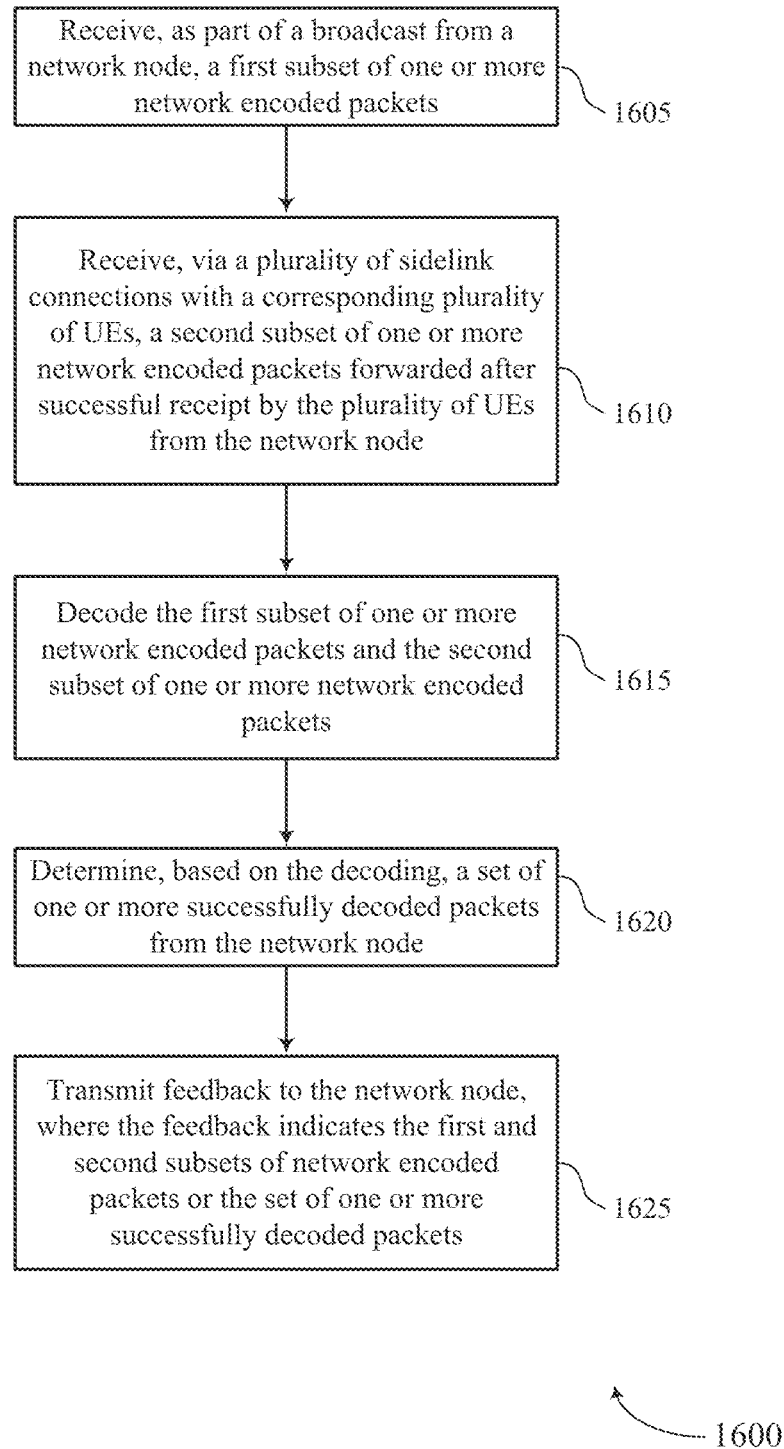

FIG. 16 shows a flowchart illustrating a method 1600 that supports feedback-based broadcasting of network coded packets with sidelink in accordance with aspects of the present disclosure. The operations of method 1600 may be implemented by a UE 115 or its components as described herein. For example, the operations of method 1600 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1605, the UE may receive, as part of a broadcast from a network node, a first subset of one or more network encoded packets. The operations of 1605 may be performed according to the methods described herein. In some examples, aspects of the operations of 1605 may be performed by a network encoded packet receiver as described with reference to FIGS. 7 through 10.

At 1610, the UE may receive, via a plurality of sidelink connections with a corresponding plurality of UEs, a second subset of one or more network encoded packets forwarded after successful receipt by the plurality of UEs from the network node. The operations of 1610 may be performed according to the methods described herein. In some examples, aspects of the operations of 1610 may be performed by a sidelink packet receiver as described with reference to FIGS. 7 through 10.

At 1615, the UE may decode the first subset of one or more network encoded packets and the second subset of one or more network encoded packets. The operations of 1615 may be performed according to the methods described herein. In some examples, aspects of the operations of 1615 may be performed by a packet decoder as described with reference to FIGS. 7 through 10.

At 1620, the UE may determine, based on the decoding, a set of one or more successfully decoded packets from the network node. The operations of 1620 may be performed according to the methods described herein. In some examples, aspects of the operations of 1620 may be performed by a packet decoder as described with reference to FIGS. 7 through 10.

At 1625, the UE may transmit feedback to the network node, where the feedback indicates the first and second subsets of network encoded packets or the set of one or more successfully decoded packets. The operations of 1625 may be performed according to the methods described herein. In some examples, aspects of the operations of 1625 may be performed by a feedback transmitter as described with reference to FIGS. 7 through 10.

Figure 17:
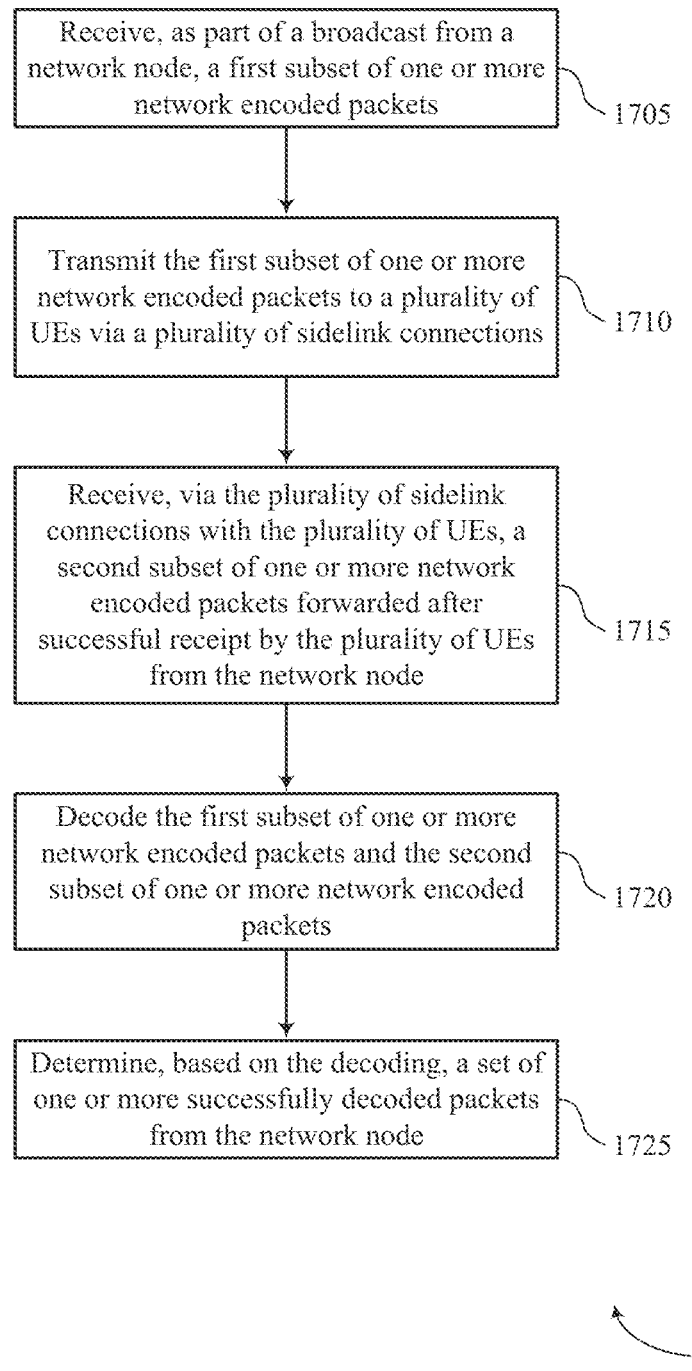

FIG. 17 shows a flowchart illustrating a method 1700 that supports feedback-based broadcasting of network coded packets with sidelink in accordance with aspects of the present disclosure. The operations of method 1700 may be implemented by a UE 115 or its components as described herein. For example, the operations of method 1700 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1705, the UE may receive, as part of a broadcast from a network node, a first subset of one or more network encoded packets. The operations of 1705 may be performed according to the methods described herein. In some examples, aspects of the operations of 1705 may be performed by a network encoded packet receiver as described with reference to FIGS. 7 through 10.

At 1710, the UE may transmit the first subset of one or more network encoded packets to a plurality of UEs via a plurality of sidelink connections. The operations of 1710 may be performed according to the methods described herein. In some examples, aspects of the operations of 1710 may be performed by a sidelink packet transmitter as described with reference to FIGS. 7 through 10.

At 1715, the UE may receive, via the plurality of sidelink connections with the plurality of UEs, a second subset of one or more network encoded packets forwarded after successful receipt by the plurality of UEs from the network node. The operations of 1715 may be performed according to the methods described herein. In some examples, aspects of the operations of 1715 may be performed by a sidelink packet receiver as described with reference to FIGS. 7 through 10.

At 1720, the UE may decode the first subset of one or more network encoded packets and the second subset of one or more network encoded packets. The operations of 1720 may be performed according to the methods described herein. In some examples, aspects of the operations of 1720 may be performed by a packet decoder as described with reference to FIGS. 7 through 10.

At 1725, the UE may determine, based on the decoding, a set of one or more successfully decoded packets from the network node. The operations of 1725 may be performed according to the methods described herein. In some examples, aspects of the operations of 1725 may be performed by a packet decoder as described with reference to FIGS. 7 through 10.

Figure 18:
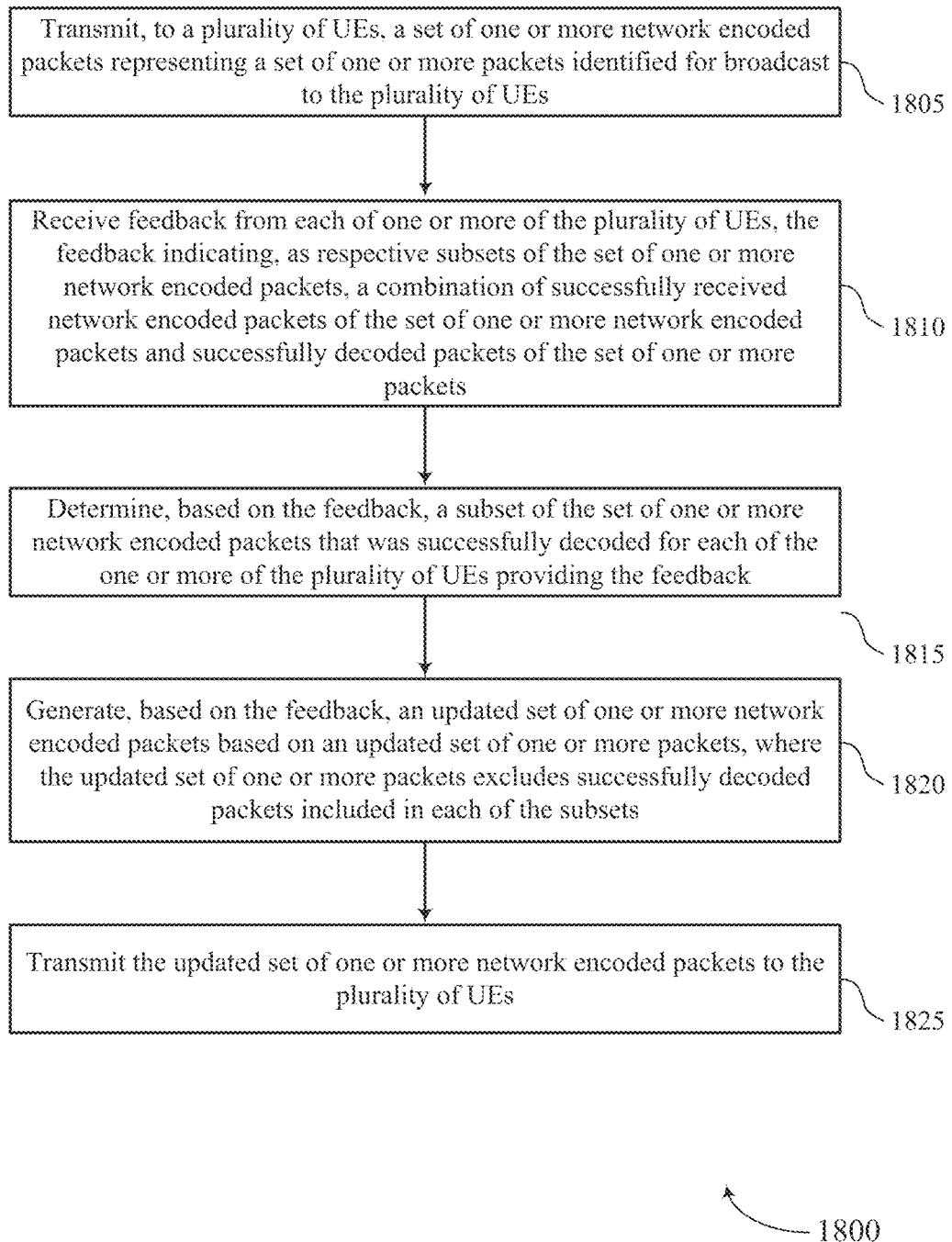

FIG. 18 shows a flowchart illustrating a method 1800 that supports feedback-based broadcasting of network coded packets with sidelink in accordance with aspects of the present disclosure. The operations of method 1800 may be implemented by a base station 105 or its components as described herein. For example, the operations of method 1800 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 1805, the base station may transmit, to a plurality of UEs, a set of one or more network encoded packets representing a set of one or more packets identified for broadcast to the plurality of UEs. The operations of 1805 may be performed according to the methods described herein. In some examples, aspects of the operations of 1805 may be performed by a network encoded packet transmitter as described with reference to FIGS. 11 through 14.

At 1810, the base station may receive feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets. The operations of 1810 may be performed according to the methods described herein. In some examples, aspects of the operations of 1810 may be performed by a feedback receiver as described with reference to FIGS. 11 through 14.

At 1815, the base station may determine, based on the feedback, a subset of the set of one or more network encoded packets that was successfully decoded for each of the one or more of the plurality of UEs providing the feedback. The operations of 1815 may be performed according to the methods described herein. In some examples, aspects of the operations of 1815 may be performed by a decoding determination component as described with reference to FIGS. 11 through 14.

At 1820, the base station may generate, based on the feedback, an updated set of one or more network encoded packets based on an updated set of one or more packets, where the updated set of one or more packets excludes successfully decoded packets included in each of the subsets. The operations of 1820 may be performed according to the methods described herein. In some examples, aspects of the operations of 1820 may be performed by a network encoded packet generator as described with reference to FIGS. 11 through 14.

At 1825, the base station may transmit the updated set of one or more network encoded packets to the plurality of UEs. The operations of 1825 may be performed according to the methods described herein. In some examples, aspects of the operations of 1825 may be performed by a network encoded packet transmitter as described with reference to FIGS. 11 through 14.

The following provides an overview of aspects of the present disclosure:

Aspect 1: A method for wireless communication at a UE, comprising: receiving, as part of a broadcast from a network node, a first subset of one or more network encoded packets; receiving, via a plurality of sidelink connections with a corresponding plurality of UEs, a second subset of one or more network encoded packets forwarded after successful receipt by the plurality of UEs from the network node; decoding the first subset of one or more network encoded packets and the second subset of one or more network encoded packets; and determining, based on the decoding, a set of one or more successfully decoded packets from the network node.

Aspect 2: The method of aspect 1, further comprising: transmitting feedback to the network node, wherein the feedback indicates the first and second subsets of network encoded packets or the set of one or more successfully decoded packets.

Aspect 3: The method of any of aspects 1 through 2, further comprising: transmitting the first subset of one or more network encoded packets to the plurality of UEs via the plurality of sidelink connections.

Aspect 4: The method of any of aspects 1 through 3, further comprising: transmitting a channel state information message in conjunction with transmitting feedback to the network node.

Aspect 5: The method of aspect 4, wherein the feedback comprises at least one negative acknowledgement message, at least one acknowledgement message, or both.

Aspect 6: The method of any of aspects 1 through 5, further comprising: receiving an indication of one or more network coding parameters, the one or more network coding parameters including a network coding algorithm, a network encoding function, a network encoding matrix, a number of decoding iterations, or any combination thereof.

Aspect 7: The method of aspect 6, wherein receiving the indication of the one or more network coding parameters comprises: receiving the one or more network coding parameters using medium access control (MAC) control element signaling, downlink control information signaling, radio resource control signaling, or any combination thereof.

Aspect 8: The method of any of aspects 6 through 7, wherein receiving the indication of the one or more network coding parameters comprises: receiving an indication to switch from one or more prior network coding parameters to the one or more network coding parameters.

Aspect 9: The method of any of aspects 6 through 8, further comprising: transmitting, to the network node, a request for the one or more network coding parameters, wherein the indication of the one or more network coding parameters is received based at least in part on transmitting the request.

Aspect 10: The method of aspect 9, wherein transmitting the request comprises: transmitting the request using medium access control (MAC) control element signaling or uplink control information signaling.

Aspect 11: The method of any of aspects 1 through 10, further comprising: receiving a third subset of one or more network encoded packets from the network node based at least in part on transmitting feedback to the network node, wherein the third subset of one or more network encoded packets is different from the first subset of one or more network encoded packets and the second subset of one or more network encoded packets.

Aspect 12: The method of aspect 11, wherein the third subset of one or more network encoded packets is provided via broadcast signaling.

Aspect 13: The method of any of aspects 11 through 12, wherein the third subset of one or more network encoded packets is provided via unicast signaling.

Aspect 14: The method of any of aspects 1 through 13, further comprising: transmitting feedback to the network node via a packet data convergence protocol (PDCP) status report, an RLC status report, or an HARQ message.

Aspect 15: The method of any of aspects 1 through 14, further comprising: transmitting feedback to the network node in a network coding sub-layer, wherein the feedback indicates a decoding status of each packet of the set of one or more successfully decoded packets.

Aspect 16: A method for wireless communication at a network node, comprising: transmitting, to a plurality of UEs, a set of one or more network encoded packets representing a set of one or more packets identified for broadcast to the plurality of UEs; receiving feedback from each of one or more of the plurality of UEs, the feedback indicating, as respective subsets of the set of one or more network encoded packets, a combination of successfully received network encoded packets of the set of one or more network encoded packets and successfully decoded packets of the set of one or more packets; determining, based at least in part on the feedback, a subset of the set of one or more network encoded packets that was successfully decoded for each of the one or more of the plurality of UEs providing the feedback; generating, based at least in part on the feedback, an updated set of one or more network encoded packets based at least in part on an updated set of one or more packets, wherein the updated set of one or more packets excludes successfully decoded packets included in each of the subsets; and transmitting the updated set of one or more network encoded packets to the plurality of UEs.

Aspect 17: The method of aspect 16, wherein determining the subset of the set of one or more network encoded packets that was successfully decoded comprises: determining which of the successfully received network encoded packets were successfully decoded so as to be added to the successfully decoded packets.

Aspect 18: The method of any of aspects 16 through 17, further comprising: continuing to update and transmit the updated set of one or more network encoded packets based on additional feedback received from the one or more of the plurality of UEs until the updated set of one or more network encoded packets is empty.

Aspect 19: The method of any of aspects 16 through 18, wherein determining the subset of the set of one or more network encoded packets comprises: determining an intersection the successfully decoded packets associated with each of the subsets indicated in the feedback to identify the successfully decoded packets common to each of the subsets.

Aspect 20: The method of any of aspects 16 through 19, further comprising: determining, based at least in part on the feedback indicative of the successfully received network encoded packets, the successfully decoded network encoded packets, or both a second subset of the set of one or more network encoded packets that was successfully decoded at any of the one or more of the plurality of UEs providing the feedback, wherein the updated set of one or more network encoded packets further excludes the second subset of the set of one or more network encoded packets.

Aspect 21: The method of aspect 20, wherein determining the second subset of the set of one or more network encoded packets comprises: determining a union of the successfully decoded packets associated with each of the subsets indicated in the feedback to identify the second subset of the set of one or more network encoded packets.

Aspect 22: The method of any of aspects 16 through 21, wherein receiving the feedback comprises: receiving the feedback via a packet data convergence protocol (PDCP) status report, an RLC status report, or an HARQ message.

Aspect 23: The method of any of aspects 16 through 22, wherein receiving the feedback comprises: receiving the feedback in a network coding sub-layer, wherein the feedback indicates a decoding status of each packet of the set of one or more packets.

Aspect 24: The method of any of aspects 16 through 23, further comprising: receiving a channel state information message in conjunction with the feedback; and determining one or more encoding metrics for transmission of the updated set of one or more packets based at least in part on the channel state information message.

Aspect 25: The method of aspect 24, wherein determining the one or more encoding metrics comprises: determining a modulation and coding scheme, an encoding rate, or both.

Aspect 26: The method of any of aspects 24 through 25, wherein receiving the channel state information message comprises: receiving the channel state information message based at least in part on the feedback indicating a negative acknowledgement for one or more of the set of one or more network encoded packets.

Aspect 27: The method of any of aspects 16 through 26, further comprising: transmitting, to one or more of the plurality of UEs, an indication of one or more network coding parameters, wherein at least the updated set of one or more network encoded packets are transmitted to the plurality of UEs in accordance with the one or more network coding parameters.

Aspect 28: The method of aspect 27, wherein transmitting the indication of the one or more network coding parameters comprises: transmitting an indication of a network coding algorithm, a network encoding function, a network encoding matrix, a number of decoding iterations, or any combination thereof.

Aspect 29: The method of any of aspects 27 through 28, wherein transmitting the indication of the one or more network coding parameters comprises: transmitting the one or more network coding parameters using medium access control-control element (MAC-CE) signaling, downlink control information signaling, radio resource control signaling, or any combination thereof.

Aspect 30: The method of any of aspects 27 through 29, wherein transmitting the indication of the one or more network coding parameters comprises: transmitting an indication to switch from one or more prior network coding parameters to the one or more network coding parameters.

Aspect 31: The method of any of aspects 27 through 30, further comprising: receiving, from the one or more of the plurality of UEs, a request for the one or more network coding parameters, wherein the indication of the one or more network coding parameters is transmitted based at least in part on receiving the request.

Aspect 32: The method of any of aspects 16 through 31, wherein transmitting the updated set of one or more network encoded packets comprises: transmitting the updated set of one or more network encoded packets via broadcast signaling based at least in part on a number of the plurality of UEs that have failed to decode each packet of the set of one or more network encoded packets being above a threshold amount.

Aspect 33: The method of any of aspects 16 through 32, wherein transmitting the updated set of one or more network encoded packets comprises: transmitting the updated set of one or more network encoded packets via unicast signaling based at least in part on a number of the plurality of UEs that have failed to decode each packet of the set of one or more network encoded packets being below a threshold amount.

Aspect 34: The method of any of aspects 16 through 33 wherein receiving the request comprises: receiving, the request using medium access control-control element (MAC-CE) signaling or uplink control information signaling.

Aspect 35: The method of any of aspects 16 through 34, further comprising: identifying the set of one or more packets from a packet pool scheduled for broadcast to the plurality of UEs.

Aspect 36: The method of aspect 35, further comprising: identifying one or more additional packets for broadcast to the plurality of UEs based at least in part on the one or more additional packets being added to the packet pool.

Aspect 37: The method of any of aspects 16 through 36, further comprising: encoding the set of one or more network encoded packets according to a Luby transform (LT) code, wherein each network encoded packet of the set of one or more network encoded packets is constructed from one or more packets of the set of one or more packets identified for broadcast to the plurality of UEs according to a distribution.

Aspect 38: The method of aspect 37, wherein the distribution comprises an ideal soliton distribution, a robust soliton distribution, or any combination thereof.

Aspect 39: An apparatus for wireless communication at a UE, comprising a processor; memory coupled with the processor; and instructions stored in the memory and executable by the processor to cause the apparatus to perform a method of any of aspects 1 through 15.

Aspect 40: An apparatus for wireless communication at a UE, comprising at least one means for performing a method of any of aspects 1 through 15.

Aspect 41: A non-transitory computer-readable medium storing code for wireless communication at a UE, the code comprising instructions executable by a processor to perform a method of any of aspects 1 through 15.

Aspect 42: An apparatus for wireless communication at a network node, comprising a processor; memory coupled with the processor; and instructions stored in the memory and executable by the processor to cause the apparatus to perform a method of any of aspects 16 through 38.

Aspect 43: An apparatus for wireless communication at a network node, comprising at least one means for performing a method of any of aspects 16 through 38.

Aspect 44: A non-transitory computer-readable medium storing code for wireless communication at a network node, the code comprising instructions executable by a processor to perform a method of any of aspects 16 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, as part of a broadcast from a network node, a first subset of one or more network encoded packets;
   receiving, via a plurality of sidelink connections with a corresponding plurality of UEs, a second subset of the one or more network encoded packets forwarded after successful receipt by the plurality of UEs from the network node;
   decoding the first subset of the one or more network encoded packets and the second subset of the one or more network encoded packets;
   determining, based on the decoding, a set of one or more successfully decoded packets from the network node; and
   receiving a third subset of the one or more network encoded packets from the network node based at least in part on transmitting feedback to the network node, wherein the third subset of the one or more network encoded packets is different from the first subset of the one or more network encoded packets and the second subset of the one or more network encoded packets.

2. The method of claim 1, further comprising:
   transmitting the first subset of the one or more network encoded packets to the plurality of UEs via the plurality of sidelink connections.

3. The method of claim 1, wherein the third subset of the one or more network encoded packets is provided via broadcast signaling.

4. The method of claim 1, wherein the third subset of the one or more network encoded packets is provided via unicast signaling.

5. An apparatus for wireless communication at a user equipment (UE), comprising:
   a processor; and
   a memory coupled with the processor, with instructions stored in the memory, the instructions being executable by the processor to cause the apparatus to:
   receive, as part of a broadcast from a network node, a first subset of one or more network encoded packets;
   receive, via a plurality of sidelink connections with a corresponding plurality of UEs, a second subset of the one or more network encoded packets forwarded after successful receipt by the plurality of UEs from the network node;
   decode the first subset of the one or more network encoded packets and the second subset of the one or more network encoded packets;
   determine, based on the decoding, a set of one or more successfully decoded packets from the network node; and
   receive a third subset of the one or more network encoded packets from the network node based at least in part on transmitting feedback to the network node, wherein the third subset of the one or more network encoded packets is different from the first subset of the one or more network encoded packets and the second subset of the one or more network encoded packets.

6. The apparatus of claim 5, wherein the instructions are further executable by the processor to cause the apparatus to:
   transmit the first subset of the one or more network encoded packets to the plurality of UEs via the plurality of sidelink connections.

7. The apparatus of claim 5, wherein the third subset of the one or more network encoded packets is provided via broadcast signaling.

8. The apparatus of claim 5, wherein the third subset of the one or more network encoded packets is provided via unicast signaling.

9. An apparatus for wireless communication at a user equipment (UE), comprising:
   means for receiving, as part of a broadcast from a network node, a first subset of one or more network encoded packets;
   means for receiving, via a plurality of sidelink connections with a corresponding plurality of UEs, a second subset of the one or more network encoded packets forwarded after successful receipt by the plurality of UEs from the network node;
   means for decoding the first subset of the one or more network encoded packets and the second subset of the one or more network encoded packets;
   means for determining, based on the decoding, a set of one or more successfully decoded packets from the network node; and
   means for receiving a third subset of the one or more network encoded packets from the network node based at least in part on transmitting feedback to the network node, wherein the third subset of the one or more network encoded packets is different from the first subset of the one or more network encoded packets and the second subset of the one or more network encoded packets.

10. The apparatus of claim 9, further comprising:
means for transmitting the first subset of the one or more network encoded packets to the plurality of UEs via the plurality of sidelink connections.

11. The apparatus of claim 9, wherein the third subset of the one or more network encoded packets is provided via broadcast signaling.

12. The apparatus of claim 9, wherein the third subset of the one or more network encoded packets is provided via unicast signaling.

13. A non-transitory computer-readable medium storing code for wireless communication at a user equipment (UE), the code comprising instructions executable by a processor to:
receive, as part of a broadcast from a network node, a first subset of one or more network encoded packets;
receive, via a plurality of sidelink connections with a corresponding plurality of UEs, a second subset of the one or more network encoded packets forwarded after successful receipt by the plurality of UEs from the network node;
decode the first subset of the one or more network encoded packets and the second subset of the one or more network encoded packets;
determine, based on the decoding, a set of one or more successfully decoded packets from the network node; and
receive a third subset of the one or more network encoded packets from the network node based at least in part on transmitting feedback to the network node, wherein the third subset of the one or more network encoded packets is different from the first subset of the one or more network encoded packets and the second subset of the one or more network encoded packets.

14. The non-transitory computer-readable medium of claim 13, wherein the instructions are further executable by the processor to cause the apparatus to:
transmit the first subset of the one or more network encoded packets to the plurality of UEs via the plurality of sidelink connections.

15. The non-transitory computer-readable medium of claim 13, wherein the third subset of the one or more network encoded packets is provided via broadcast signaling.

16. The non-transitory computer-readable medium of claim 13, wherein the third subset of the one or more network encoded packets is provided via unicast signaling.

* * * * *